(12) United States Patent
Chuang et al.

(10) Patent No.: US 11,743,508 B2
(45) Date of Patent: *Aug. 29, 2023

(54) TREE-TYPE CODING FOR VIDEO CODING

(71) Applicant: QUALCOMM Incorporated, San Diego, CA (US)

(72) Inventors: Hsiao-Chiang Chuang, San Diego, CA (US); Xiang Li, Saratoga, CA (US); Jianle Chen, San Diego, CA (US); Feng Zou, Sunnyvale, CA (US); Wei-Jung Chien, San Diego, CA (US); Yi-Wen Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 101 days.

This patent is subject to a terminal disclaimer.

(21) Appl. No.: 17/373,525

(22) Filed: Jul. 12, 2021

(65) Prior Publication Data

US 2021/0344970 A1 Nov. 4, 2021

Related U.S. Application Data

(63) Continuation of application No. 16/798,039, filed on Feb. 21, 2020, now Pat. No. 11,089,339, which is a (Continued)

(51) Int. Cl.
*H04N 19/96* (2014.01)
*H04N 19/119* (2014.01)
(Continued)

(52) U.S. Cl.
CPC .......... *H04N 19/96* (2014.11); *H04N 19/119* (2014.11); *H04N 19/134* (2014.11);
(Continued)

(58) Field of Classification Search
CPC .... H04N 19/96; H04N 19/119; H04N 19/134; H04N 19/176; H04N 19/463; H04N 19/593; H04N 19/70
(Continued)

(56) References Cited

U.S. PATENT DOCUMENTS

| | | | |
|---|---|---|---|
| 10,609,423 B2 | 3/2020 | Chuang et al. | |
| 2011/0170610 A1 | 7/2011 | Min et al. | |

(Continued)

FOREIGN PATENT DOCUMENTS

| | | |
|---|---|---|
| CN | 102355579 A | 2/2012 |
| CN | 102595116 A | 7/2012 |

(Continued)

OTHER PUBLICATIONS

Bross B., et al., "High Efficiency Video Coding (HEVC) Text Specification Draft 10 (for FDIS & Last Call)", 12th Meeting, Geneva, CH, Jan. 14-23, 2013, (Joint Collaborative Team on Video Coding of ISO/IEC JTC 1/SC 29/WG 11 and ITU-T SG 16 WP 3), JCTVC-L1003_v34, Mar. 19, 2013, 310 pages, please consider section 8.5.3.2.5 on pp. 124 and 125, section 8.5.3.2.6 on pp. 125-128, and section 8.5.3.2.7 on pp. 128 and 129.

(Continued)

*Primary Examiner* — Jerome Grant, II
(74) *Attorney, Agent, or Firm* — Shumaker & Sieffert, PA

(57) ABSTRACT

An example device includes a memory to store the video data, and processing circuitry in communication with the memory. The processing circuitry is configured to compare a value of a dimension of a current block of the stored video data to a value of a corresponding dimension of a neighboring block of the current block to obtain a relative dimension value. The processing circuitry is further configured to determine, based on the relative dimension value, that the current block is to be partitioned according to a (Continued)

prediction tree (PT) portion of a multi-type tree-based partitioning scheme. The PT portion comprises partitioning according to one of a binary tree structure or a center-side triple tree structure. The processing circuitry is further configured to partition, based on the determination, the current block according to the PT portion, to form a plurality of sub-blocks.

15 Claims, 11 Drawing Sheets

Related U.S. Application Data continuation of application No. 15/697,134, filed on Sep. 6, 2017, now Pat. No. 10,609,423.

(60) Provisional application No. 62/384,585, filed on Sep. 7, 2016.

(51) Int. Cl.
| | |
|---|---|
| *H04N 19/463* | (2014.01) |
| *H04N 19/134* | (2014.01) |
| *H04N 19/176* | (2014.01) |
| *H04N 19/593* | (2014.01) |

(52) U.S. Cl.
CPC ......... *H04N 19/176* (2014.11); *H04N 19/463* (2014.11); *H04N 19/593* (2014.11)

(58) Field of Classification Search
USPC ........................................................ 282/103
See application file for complete search history.

(56) References Cited

U.S. PATENT DOCUMENTS

| | | |
|---|---|---|
| 2012/0177120 A1 | 7/2012 | Guo et al. |
| 2012/0213278 A1 | 8/2012 | Yasugi et al. |
| 2013/0034157 A1 | 2/2013 | Helle et al. |
| 2013/0034171 A1 | 2/2013 | Winken et al. |
| 2013/0039423 A1 | 2/2013 | Helle et al. |
| 2013/0128974 A1 | 5/2013 | Chien et al. |
| 2013/0195199 A1 | 8/2013 | Guo et al. |
| 2013/0250049 A1 | 9/2013 | Schwerdtner |
| 2013/0251026 A1 | 9/2013 | Guo et al. |
| 2013/0266074 A1 | 10/2013 | Guo et al. |
| 2013/0272381 A1 | 10/2013 | Guo et al. |
| 2015/0181218 A1 | 6/2015 | Okawa |
| 2016/0261870 A1 | 9/2016 | Tu et al. |
| 2016/0277739 A1 | 9/2016 | Puri et al. |
| 2017/0208336 A1 | 7/2017 | Li et al. |
| 2017/0272782 A1 | 9/2017 | Li et al. |
| 2017/0324978 A1* | 11/2017 | Xu .......................... H04N 19/56 |
| 2017/0332099 A1 | 11/2017 | Lee et al. |
| 2017/0347128 A1 | 11/2017 | Panusopone et al. |
| 2018/0070110 A1 | 3/2018 | Chuang et al. |
| 2018/0098097 A1 | 4/2018 | Huang et al. |
| 2018/0124398 A1 | 5/2018 | Park et al. |
| 2018/0139453 A1 | 5/2018 | Park et al. |
| 2018/0199072 A1 | 7/2018 | Li et al. |
| 2018/0270509 A1 | 9/2018 | Chuang et al. |
| 2018/0316934 A1 | 11/2018 | Nam et al. |
| 2018/0332288 A1 | 11/2018 | Hsiang et al. |
| 2018/0359469 A1 | 12/2018 | Won et al. |
| 2019/0037212 A1 | 1/2019 | Kim et al. |
| 2019/0037245 A1 | 1/2019 | Kirchhoffer et al. |
| 2019/0037246 A1 | 1/2019 | Sasai et al. |
| 2019/0058881 A1 | 2/2019 | Seo et al. |
| 2019/0281285 A1 | 9/2019 | Piao et al. |
| 2019/0289301 A1 | 9/2019 | Lim et al. |
| 2020/0228797 A1 | 7/2020 | Park et al. |
| 2020/0267412 A1 | 8/2020 | Karczewicz et al. |
| 2020/0267418 A1 | 8/2020 | Chuang |
| 2020/0288156 A1 | 9/2020 | Huang et al. |
| 2020/0296423 A1 | 9/2020 | Chao et al. |
| 2020/0359037 A1 | 11/2020 | Ramasubramonian et al. |
| 2020/0359050 A1 | 11/2020 | Van Der Auwera et al. |
| 2020/0366888 A1 | 11/2020 | Seregin et al. |
| 2020/0366889 A1 | 11/2020 | Huang et al. |
| 2020/0366891 A1 | 11/2020 | Hu et al. |
| 2020/0374528 A1 | 11/2020 | Huang et al. |
| 2020/0382813 A1 | 12/2020 | Karczewicz et al. |

FOREIGN PATENT DOCUMENTS

| | | |
|---|---|---|
| CN | 102984521 A | 3/2013 |
| CN | 103650503 A | 3/2014 |
| EP | 2547107 A2 | 1/2013 |
| EP | 2804383 A1 | 11/2014 |
| EP | 2868087 A1 | 5/2015 |
| EP | 3383044 A1 | 10/2018 |
| EP | 3383045 A1 | 10/2018 |
| JP | 2013509788 A | 3/2013 |
| JP | 2013229674 A | 11/2013 |
| JP | 2014195324 A | 10/2014 |
| WO | WO-2011087297 A2 | 7/2011 |
| WO | WO-2011128269 A1 | 10/2011 |
| WO | WO-2014120367 A1 | 8/2014 |
| WO | WO-2014120369 A1 | 8/2014 |
| WO | WO-2016083729 A2 | 6/2016 |
| WO | WO-2016091161 A1 | 6/2016 |
| WO | WO-2016155641 A1 | 10/2016 |
| WO | WO-2017123980 | 7/2017 |

OTHER PUBLICATIONS

Chen J., et al., "Algorithm Description of Joint Exploration Test Model 2", Joint Video Exploration Team (JVET) of ITU-T SG 16 WP 3 and ISO/IEC JTC 1/SC 29/WG 11, 2nd Meeting, San Diego, CA, USA, Feb. 20-26, 2016, [JVET-B1001 v3], Mar. 25, 2016 (Mar. 25, 2016), 32 Pages, JVET-B1001 (Version 3), pp. 6-7.

Chen J., et al., "Algorithm Description of Joint Exploration Test Model 7 (JEM7)", JVET-G1001-V1, Joint Video Exploration Team (JVET) of ITU-T SG 16 WP3 and ISO/IEC JTC 1/SC 29/WG 11, 7th Meeting, Jul. 13, 2017-Jul. 21, 2017, Torino, Aug. 19, 2017 (Aug. 19, 2017), XP030150980, 48 Pages, pages i-iv, Retrieved from the Internet: URL: http://phenix.int-evry.fr/jvet/doc_end_user/documents/7_Torino/wg11/JVET-G0001-v1.zip.

Davies T., et al., "Suggestion fora Test Model", BBC, JCTVC-A033, 1st Meeting, Apr. 15, 2010-Apr. 23, 2010, (Joint Collaborative Team on Video Coding of ISO/IEC JTC1/SC29/WG11 and ITU-TSG 16), Dresden, DE, XP030007526, May 7, 2010 (May 7, 2010), pp. 1-30.

Fraunhofer HHI., "Transform Coding Using the Residual Quadtree (RQT)", retrieved from: http://www.hhi.fraunhofer.de/fields-of-competence/image-processing/research-groups/image-video-coding/hevc-high-efficiency-video-coding/transform-coding-using-the-residual-quadtree-rqt.html, Mar. 6, 2017, pp. 1-4.

Han W-J., et al., "Improved Video Compression Efficiency Through Flexible Unit Representation and Corresponding Extension of Coding Tools," IEEE Transactions on Circuits and Systems for Video Technology, vol. 20, No. 12, Dec. 2010, pp. 1709-1720.

Huang H., "EE2.1: Quadtree plus binary tree structure integration with JEM tools," Joint Video Exploration Team (JVET) of ITU-T SG 16 WP 3 and ISO/IEC JTC 1/SC 29/WG 11, 3rd Meeting: Geneva, CH, May 26-Jun. 1, 2016, JVET-C0024, 5 pp.

Huang H., EE2.1: Quadtree plus binary tree structure integration with JEM tools, Joint Video Exploration Team (JVET) of ITU-T SG16 WP3 and ISO/IEC JTC1/SC29/WG11 3rd Meeting: Geneva, CH, May 26-Jun. 1, 2016, JVET-C0024_r1, 5 Pages.

International Preliminary Report on Patentability dated Nov. 16, 2018 in International Application No. PCT/US2017/050464, 28 pp.

International Search Report and Written Opinion—PCT/US2017/050464—ISA/EPO—dated Nov. 27, 2017.

International Standard, "Information Technology—High Efficiency Coding and Media Delivery in Heterogeneous Environments—Part 2: High efficiency video coding," ISO/IEC 23008-2, First edition, Dec. 1, 2013, 312 pp.

(56) References Cited

OTHER PUBLICATIONS

ITU-T H.223, "Series H: Audiovisual and Multimedia Systems, Infrastructure of Audiovisual Services—Transmission Multiplexing and Synchronization, Multiplexing Protocol for Low Bit Rate Multimedia Communication", The International Telecommunication Union, Jul. 2001, 74 Pages.

ITU-T H.261, Line Transmission of Non-Telephone Signals, Video Codec for Audiovisual Services At p × 64 kbits, The International Telecommunication Union, Mar. 1993, 29 pp.

ITU-T H.261, Line Transmission on Non-Telephone Signals, Video Codec for Audiovisual Services at p × 64 kbits, The international Telecommunication Union, Mar. 1993, 32 pp_.

ITU-T H.262., "Transmission of Non-Telephone Signals, Information Technology—Generic Coding of Moving Pictures and Associated Audio Information: Video," The International Telecommunication Union, Jul. 1995, 211 pp.

ITU-T H.262, Transmission of Non-Telephone Signals, Information technology—Generic coding of moving pictures and associated audio information: Video, The International Telecommunication Union, Feb. 2000, 211 pp.

ITU-T H.263, Line Transmission of Non-Telephone Signals, Video Coding for Low Bitrate Communication, The international Telecommunication Union, May 2, 1996, 54 pages.

ITU-T H.263, "Video Coding for Low Bit Rate Communication", Series H: Audiovisual and Multimedia Systems, Infrastructure of audiovisual services—Coding of moving video, Jan. 2005, 226 pages.

ITU-T H.264, Series H: Audiovisual and Multimedia Systems, Infrastructure of Audiovisual Services—Coding of Moving Video, Advanced Video Coding for Generic Audiovisual Services, The International Telecommunication Union, Jun. 2011, 674 Pages.

ITU-T H.265, "Series H: Audiovisual and Multimedia Systems, Infrastructure of Audiovisual Services—Coding of Moving Video, High efficiency Video Coding", The International Telecommunication Union, Dec. 2016, 664 Pages.

"ITU-T H.265, Series H: Audiovisual and Multimedia Systems, Infrastructure of Audiovisual Services—Coding of Moving Video, High Efficiency Video Coding", The International Telecommunication Union, Apr. 2015, 634 Pages, please consider section 7.4.9.6 on p. 102, section 8.5.3.2.6 on p. 141, section 8.5.3.2.7 on pp. 141-145, and section 8.5.3.2.8 on p. 145.

Karczewicz M., et al., "Study of Coding Efficiency Improvements beyond HEVC", 113. MPEG Meeting; Oct. 19, 2015-Oct. 23, 2015; Geneva; (International Organization for Standardization Organization International de Normalization Coding of Moving Pictures and Audio Motion Picture Expert Group or ISO/IEC JTC1/SC29/WG11), No. M37102, Oct. 15, 2015 (Oct. 15, 2015), 13 Pages, XP030065470, whole document.

Kim I-K., et al., "Block Partitioning Structure in the HEVC Standard", IEEE Transactions on Circuits and Systems for Video Technology, Institute of Electrical and Electronics Engineers, USA, vol. 22, No. 12, Dec. 1, 2012, pp. 1697-1706, XP011487154, ISSN: 1051-8215, DOI: 10.1109/TCSVT.2012.2223011.

Li X., et al., "Multi-Type-Tree", 4. JVET Meeting; Oct. 15, 2016-Oct. 21, 2016; Chengdu; (The Joint Video Exploration Team of ISO/IEC JTC1/SC29/WG11 and ITU-T SG.16); JVET-D0117R1, JVET, Chengdu, CN, vol. JVET-D0117R1, No. JVET-D0117r1, Oct. 20, 2016 (Oct. 20, 2016), pp. 1-3, Oct. 15, 2016-Oct. 21, 2016, XP030150367, Retrieved from the Internet: URL: http://phenix.int-evry.fr/jvet/ the whole document.

Mediatek Inc: "Block Partitioning Structure for Next Generation Video Coding; C 966 R3", ITU-T SG16 Meeting, Oct. 12, 2015-Oct. 23, 2015, Geneva, CH, vol. 6/16, No. T13-SG16-C-0966, Sep. 28, 2015 (Sep. 28, 2015), XP030100738, 8 Pages.

Minezawa A., et al., "Proposed Fix on CBF Flag Signaling", 98, MPEG Meeting, Nov. 28, 2011-Feb. 12, 2011, Geneva, (Motion Picture Expert Group or ISO/IEC JTC1/SC29/WG11), No. m22008, Nov. 28, 2011 (Nov. 28, 2011), JCTVC-G0444-r1, pp. 1-5, XP030050571.

Response filed on Jul. 5, 2018, in response to Written Opinion dated Nov. 27, 2017, in International Application No. PCT/US2017/050464, 26 pp.

Second Written Opinion dated Sep. 6, 2018 in International Application No. PCT/US2017/050464, 6 pp.

Song B.C., et al., "A New Proposal on Motion Estimation with the OBMC on/off Mode for the Advanced Mode," 39. MPEG Meeting; Jul. 4, 1997-Nov. 4, 1997; Bristol; (Motion Pictureexpert Group or ISO/IEC JTC1/SC29/WG11),, No. M2057, Mar. 30, 1997 (Mar. 30, 1997), XP030031345, ISSN: 0000-0323, 10 pages.

Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages, please consider section 8.5.3.2.6 on p. 125, section 8.5.3.2.7 on pp. 126-129, and section 8.5.3.2.8 on pp. 129 and 130.

Wu W., et al., "Fast Prediction Unit Partition Mode Selection for High-efficiency Video Coding Interceding Using Motion Homogeneous Coding Units", Journal of Electronic Imaging, Spiez IS&T, 1000 20TH St. Bellingham WA 98225-6705 USA, vol. 24, No. 6, Nov. 1, 2015 (Nov. 1, 20150, pp. 63024-1-63024-21, XP060072204, ISSN: 1017-9909, DOI: 10.1117/1.JEI.24.6.063024 [retrieved on Dec. 30, 2015].

Taiwan Search Report—TW106130624—TIPO—dated Feb. 8, 2022.

Li X., et al., "Multi-Type-Tree", Joint Video Exploration Team (JVET) of ITU-T SG 16 WP 3 and ISO/IEC JTC 1/SC29/WG 11, JVET-D0117, 4th Meeting, Chengdu, CN, Oct. 15-21, 2016, 3 Pages, Oct. 6, 2016.

\* cited by examiner

PART_NxN

PART_nRx2N

PART_Nx2N

PART_nLx2N

PART_2NxN

PART_2NxnD

PART_2Nx2N

PART_2NxnU

111

101

110

100

000

TREE-TYPE CODING FOR VIDEO CODING

This application is a continuation of U.S. application Ser. No. 16/798,039, filed Feb. 21, 2020, which is a continuation of U.S. application Ser. No. 15/697,134, filed Sep. 6, 2017, which claims the benefit of U.S. Provisional Application No. 62/384,585 filed Sep. 7, 2016. Each of the above-referenced applications is incorporated by reference in their entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by various video coding standards. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. In addition, a new video coding standard, namely High Efficiency Video Coding (HEVC), has recently been developed by the Joint Collaboration Team on Video Coding (JCT-VC) of ITU-T Video Coding Experts Group (VCEG) and ISO/IEC Motion Picture Experts Group (MPEG). The latest HEVC draft specification, and referred to as "HEVC WD" hereinafter, is available from http://phenix.int-evry.fr/jct/doc_end_user/documents/14_Vienna/wg11/JCTVC-N1003-v1.zip. The specification of HEVC and its extensions including Format Range (RExt), Scalability (SHVC), and Multi-View (MV-HEVC) Extensions and Screen Content Extensions is available from http://phenix.int-evey.fr/jct/doc_end_user/current_document.php?id=10481. ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. The latest version of the reference software, i.e., Joint Exploration Model 7 (JEM 7) can be downloaded from: https://jvet.hhi.fraunhofer.de/svn/svn_HMJEMSoftware/tags/HM-16.6-JEM-7.0/. The algorithm description for JEM-7.0 is further described in "Algorithm description of Joint Exploration Test Model 7," by J. Chen, E. Alshina, G. J. Sullivan, J.-R. Ohm, J. Boyce, JVET-G1001, Geneva, July 2017.

The video devices may transmit, receive, encode, decode, and/or store digital video information more efficiently by implementing such video coding techniques. Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which for some techniques may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to coding (e.g., encoding and/or decoding) of video data. Some aspects of this disclosure are directed to enhancing coding and signaling efficiency with respect to block partitioning structures that have been developed subsequently to HEVC.

In one example, this disclosure is directed to a method of coding video data. The method includes comparing a dimension of a current block of the video data to a corresponding dimension of a neighboring block of the current block to obtain a relative dimension, the neighboring block being positioned adjacent to the current block. The method further includes determining, based on the relative dimension, that the current block is to be partitioned according to a prediction tree (PT) portion of a multi-type tree-based partitioning scheme, the PT portion of the multi-type tree-based partitioning scheme comprising partitioning according to one of a binary tree structure or a center-side triple tree structure. The method further includes partitioning, based on the determination, partitioning the current block according to the PT portion of the multi-type tree-based partitioning scheme to form a plurality of sub-blocks.

In another example, this disclosure is directed to a device for coding video data. The device comprises a memory configured to store the video data, and processing circuitry in communication with the memory. The processing circuitry is configured to compare a value of a dimension of a current block of the stored video data to a value of a corresponding dimension of a neighboring block of the current block to obtain a relative dimension value, the neighboring block being positioned adjacent to the current block. The processing circuitry is further configured to determine, based on the relative dimension value, that the current block is to be partitioned according to a prediction tree (PT) portion of a multi-type tree-based partitioning scheme, the PT portion of the multi-type tree-based partitioning scheme comprising partitioning according to one of a binary tree structure or a center-side triple tree structure. The processing circuitry is further configured to partition, based on the determination, the current block according to the PT portion of the multi-type tree-based partitioning scheme to form a plurality of sub-blocks.

In another example, a non-transitory computer-readable storage medium is encoded with instructions. The instructions, when executed, cause one or more processors of a video coding device to compare a value of a dimension of a current block of video data to a value of a corresponding dimension of a neighboring block of the current block to obtain a relative dimension value, the neighboring block being positioned adjacent to the current block. The instructions, when executed, further cause the one or more processors of the video coding device to determine, based on the relative dimension value, that the current block is to be partitioned according to a prediction tree (PT) portion of a multi-type tree-based partitioning scheme, the PT portion of the multi-type tree-based partitioning scheme comprising partitioning according to one of a binary tree structure or a center-side triple tree structure. The instructions, when executed, further cause the one or more processors of the video coding device to partition, based on the determination, the current block according to the PT portion of the multi-type tree-based partitioning scheme to form a plurality of sub-blocks.

In another example, an apparatus for coding video data includes means for comparing a dimension of a current block of the video data to a corresponding dimension of a neighboring block of the current block to obtain a relative dimension, the neighboring block being positioned adjacent to the current block. The apparatus further includes means for determining, based on the relative dimension, that the current block is to be partitioned according to a prediction tree (PT) portion of a multi-type tree-based partitioning scheme, the PT portion of the multi-type tree-based partitioning scheme comprising partitioning according to one of a binary tree structure or a center-side triple tree structure. The apparatus further includes means for partitioning, based on the determination, partitioning the current block according to the PT portion of the multi-type tree-based partitioning scheme to form a plurality of sub-blocks.

The details of one or more examples are set forth in the accompanying drawings and the description below. Other features, objects, and advantages will be apparent from the description and drawings, and from the claims.

DETAILED DESCRIPTION

Figure 1:
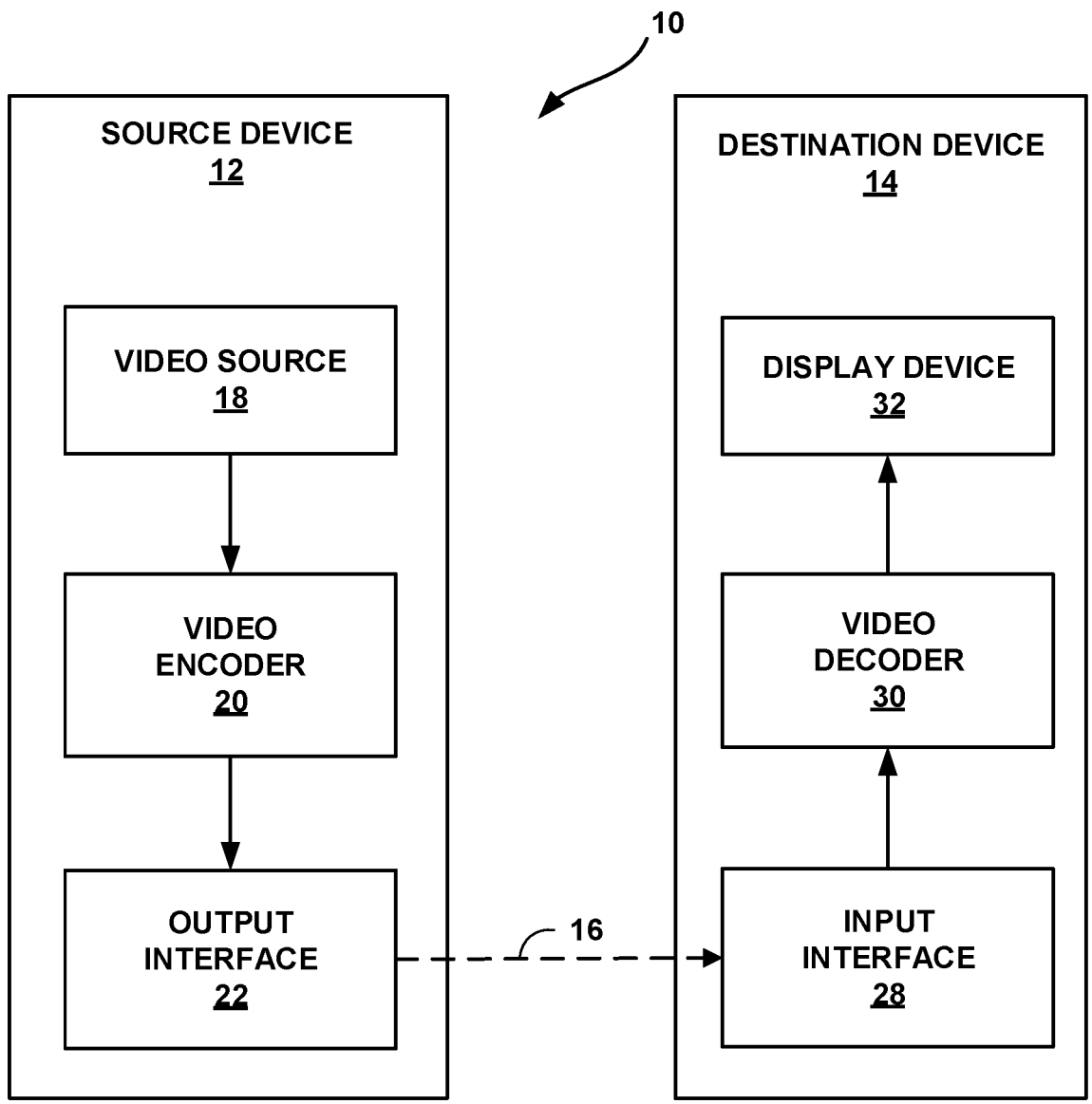
FIG. 1 is a block diagram illustrating an example video encoding and decoding system that may be configured to perform the techniques of this disclosure.

FIG. 1 is a block diagram illustrating an example video encoding and decoding system 10 that may be configured to perform the techniques of this disclosure for motion vector prediction. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques of this disclosure for motion vector prediction. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. The techniques of this disclosure for motion vector prediction may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard, extensions to the HEVC standard, or subsequent standards, such as ITU-T H.266. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, logic circuitry, processing circuitry, such as fixed function processing circuitry and/or programmable processing circuitry, hardware, firmware, software, or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. One joint draft of MVC is described in "Advanced video coding for generic audiovisual services," ITU-T Recommendation H.264, March, 2010.

In addition, there is a newly developed video coding standard, namely High Efficiency Video Coding (HEVC), developed by the Joint Collaboration Team on Video Coding (JCT-VC) of ITU-T Video Coding Experts Group (VCEG) and ISO/IEC Motion Picture Experts Group (MPEG). A recent draft of HEVC is available from http://phenix.int-evry.fr/jct/doc_end_user/documents/12_Geneva/wg11/JCTVC-L1003-v34.zip. The HEVC standard is also presented jointly in Recommendation ITU-T H.265 and International Standard ISO/IEC 23008-2, both entitled "High efficiency video coding," and both published October, 2014.

The JCT-VC developed the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HEVC HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. According to the HEVC standard, a TU is always square-shaped. That is, when the transform is applied, a one-dimensional transform of the same size is applied both horizontally and vertically.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0 or List 1) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol. In some examples, video encoder 20 and/or video decoder 30 may use affine models in motion estimation and compensation.

Figure 2:
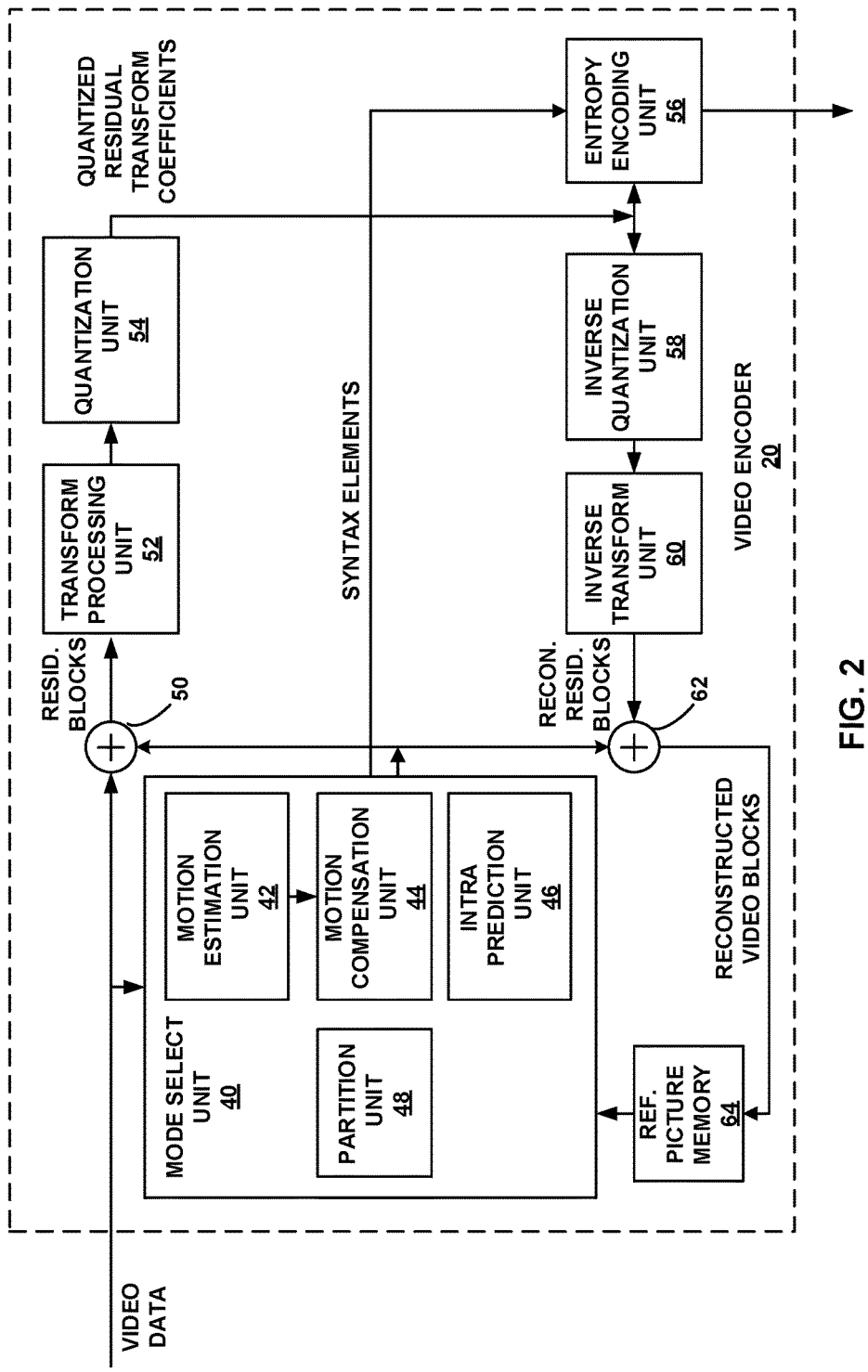
FIG. 2 is a block diagram illustrating an example of video encoder that may be configured to perform the techniques of this disclosure.

FIG. 2 is a block diagram illustrating an example of video encoder 20 that may be configured to perform the techniques of this disclosure for motion vector prediction. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Video encoder 20 may be configured to perform any of the various techniques of this disclosure discussed above with respect to FIG. 1, and as will be described in more detail below. For example, motion compensation unit 44 may be configured to code motion information for a block of video data using AMVP or merge mode in accordance with the techniques of this disclosure.

Assuming that motion compensation unit 44 elects to perform merge mode, motion compensation unit 44 may form a candidate list including a set of merge candidates. Motion compensation unit 44 may add candidates to the candidate list based on a particular, predetermined order. Motion compensation unit 44 may also add additional candidates and perform pruning of the candidate list, as discussed above. Ultimately, mode select unit 40 may determine which of the candidates is to be used to encode motion information of the current block, and encode a merge index representing the selected candidate.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

Figure 3:
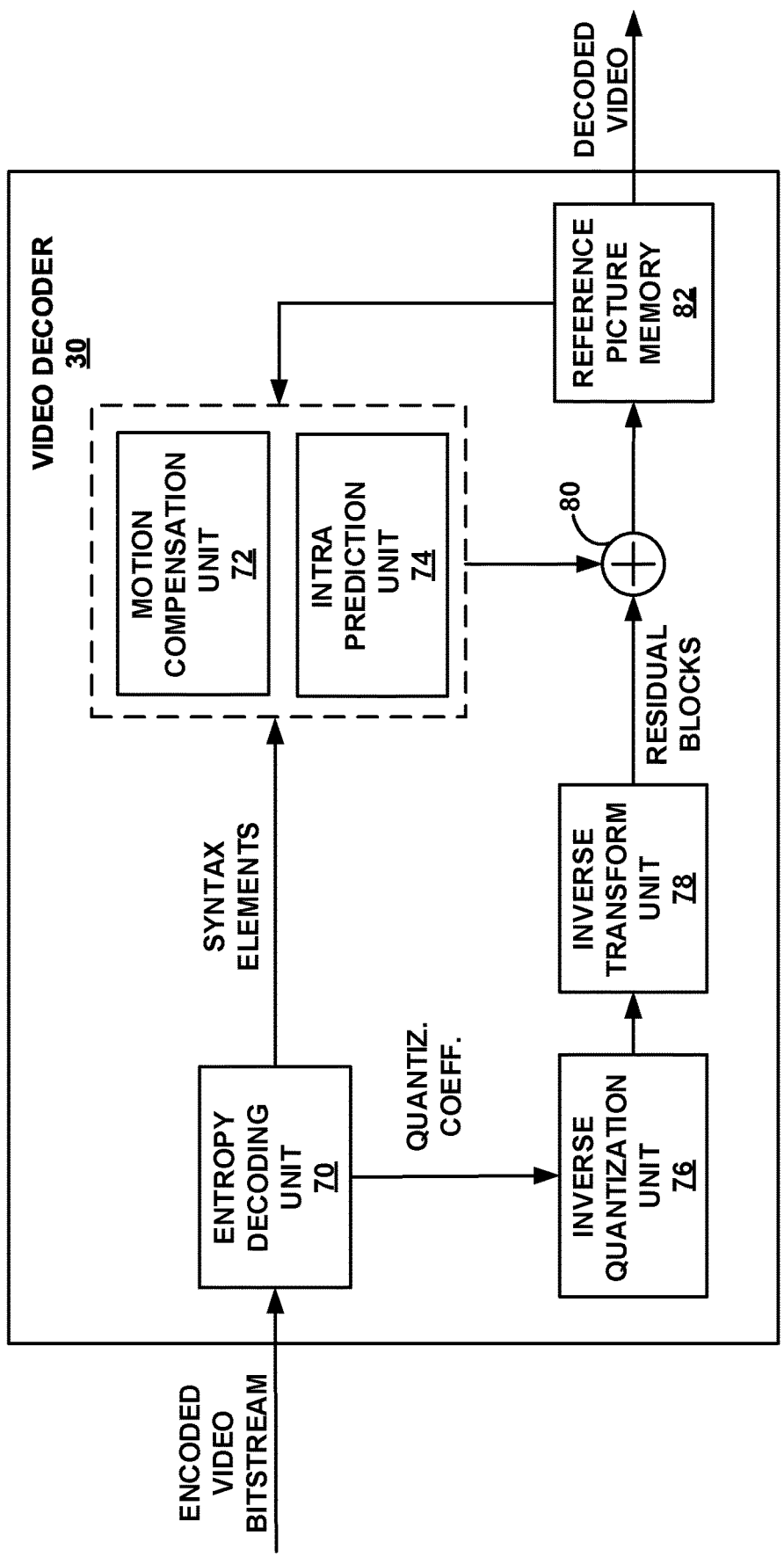
FIG. 3 is a block diagram illustrating an example of video decoder that may be configured to perform the techniques of this disclosure.

FIG. 3 is a block diagram illustrating an example of video decoder 30 that may be configured to perform the motion vector prediction techniques of this disclosure. In the example of FIG. 3, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Video decoder 30 may be configured to perform any of the various techniques of this disclosure discussed above with respect to FIG. 1, and as will be discussed in more detail below. For example, motion compensation unit 72 may be configured to determine to perform motion vector prediction using AMVP or merge mode in accordance with the techniques of this disclosure. Entropy decoding unit 70 may decode one or more syntax elements representing how motion information is coded for the current block.

Assuming that the syntax elements indicate that merge mode is performed, motion compensation unit 72 may form a candidate list including a set of merge candidates. Motion compensation unit 72 may add candidates to the candidate list based on a particular, predetermined order. Motion compensation unit 72 may also add additional candidates and perform pruning of the candidate list, as discussed above. Ultimately, motion compensation unit 72 may decode a merge index representing which of the candidates is used to code motion information for the current block.

Inverse quantization unit 76 inverse quantizes, i.e., de-quantizes, quantized transform coefficients provided in the bitstream and entropy decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

In HEVC, the largest coding unit in a slice is called a coding tree unit (CTU). A CTU contains a quad-tree. The nodes of the quad-tree are referred to as coding units (CUs). Also, a CTU contains one luma coding tree block (CTB) and two chroma CTBs, as well as the associated syntax elements. The size of a luma CTB can be in a range from 16×16 to 64×64 according to the HEVC main profile. However, it will be appreciated that technically, 8×8 CTB sizes can be supported, as well. A CTU may be recursively split into coding units (CUs) in a quad-tree manner, such as the quad-tree structure shown in FIGS. 4A and 4B, which are described below.

Figure 4B:
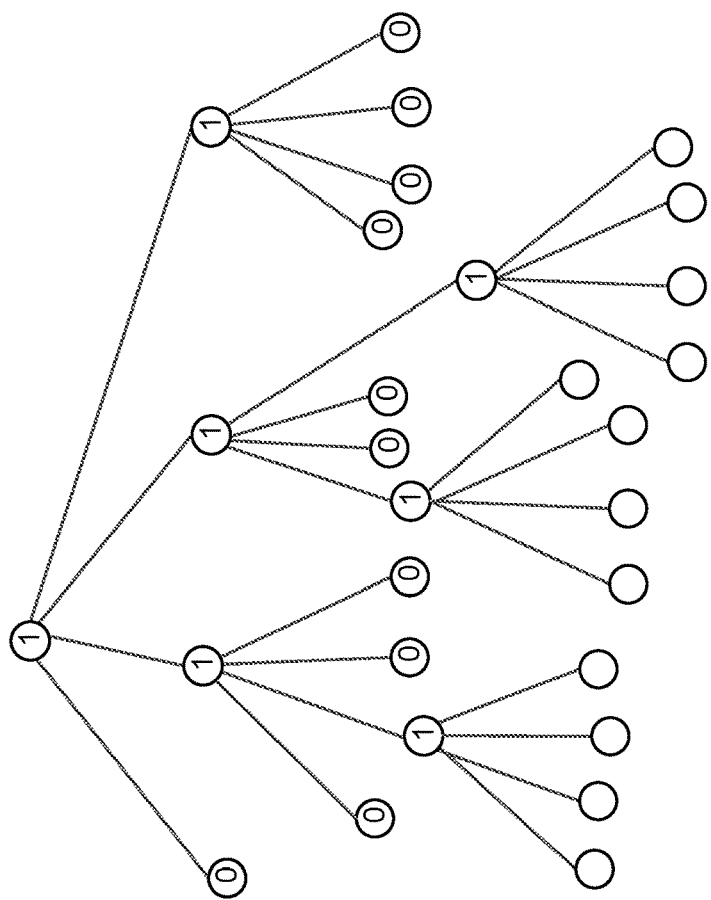
FIGS. 4A and 4B are conceptual diagrams illustrating an example of CTU-to-CU partition in HEVC, and the corresponding quadtree representation of the HEVC CTU-to-CU partition.
Figure 4A:
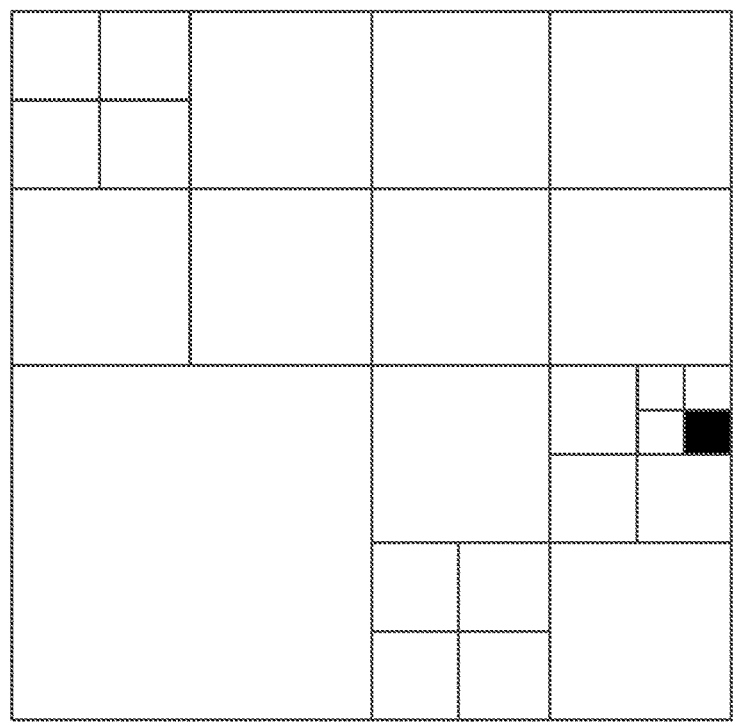

FIGS. 4A and 4B are conceptual diagrams illustrating an example of CTU-to-CU partition in HEVC, and the corresponding quadtree representation of the HEVC CTU-to-CU partition. That is, the partitioning depth of each branch and sub-branch of FIG. 4B corresponds to the quadtree partitioning that produces the CUs illustrated in FIG. 4A. One of the sub-blocks illustrated in FIG. 4A is shaded in, to illustrate that the shaded-in sub-block is an example of an 8×8 CU. For the shaded-in sub-block, no further split is allowed, and hence, no split-related signaling may be required. In cases where the leaf nodes illustrated in FIG. 4B (e.g., the CUs resulting from the partitioning in FIG. 4A) correspond to an 8×8 CU, no signaling is required. Aspects of the quad-tree representation are described in "Improved Video Compression Efficiency Through Flexible Unit Representation and Corresponding Extension of Coding Tools" by W. J. Han et al, IEEE Transaction on Circuits and Systems for Video Technology, vol. 20, no. 12, pp. 1709-1720, December 2010. The signaling of the CTU-to-CU partitioning of FIG. 4A follows the quadtree structure illustrated in FIG. 4B, where each respective node in the illustrated quadtree consumes one bit to indicate whether or not the respective node should be further split. For instance, video encoder 20 may signal the CTU-to-CU partition scheme of FIG. 4A to video decoder 30 according to the signaling features described above.

A CU size could be the same as the size of a CTB, although the CU size can be as small as 8×8. Each coding unit (CU) is coded according to one mode. For instance, video encoder 20 may encode, and video decoder 30 may decode, each CU according to either an intra mode or an inter mode. If a CU is inter coded (i.e., video encoder 20 applies inter mode in encoding the CU), the CU may be further partitioned into two (2) or four (4) prediction units (PUs), or may become just one (1) PU when further partitioning does not apply. When two PUs are present in one CU, the PUs can be rectangles that each covers half the size (area) of the CU, or the PUs may be two rectangles with respective sizes (e.g., areas) with a quarter (¼) and three-quarters (¾) the size of the CU.

Figure 5:
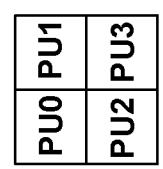
FIG. 5 is a conceptual diagram illustrating partition modes for coding units (CUs) coded with inter prediction mode.
Figure 5:
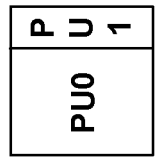
Figure 5:
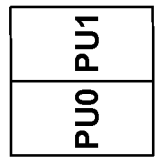
Figure 5:
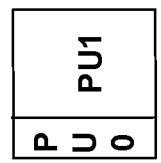
Figure 5:
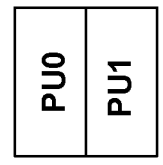
Figure 5:
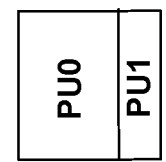
Figure 5:
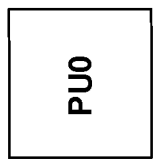
Figure 5:
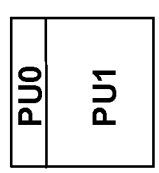

FIG. 5 is a conceptual diagram illustrating partition modes for an inter prediction mode. There are eight (8) partition modes for CUs coded with the inter prediction mode, as shown in FIG. 5. The eight (8) partition modes shown in FIG. 5 are PART_2N×2N, PART_2N×N, PART_N×2N, PART_N×N, PART_2N×nU, PART_2N×nD, PART_nL×2N and PART_nR×2N.

In cases where a particular CU is inter coded, one set of motion information is present for each PU. For instance, if video encoder 20 inter-codes the CU, then video encoder 20 may signal one set of motion information to video decoder 30 for the CU. In addition, video encoder 20 and/or video decoder 30 may code (e.g., encode or decode, respectively) each PU with a unique inter-prediction mode to derive the respective set of motion information. In cases where a CU is intra coded, 2N×2N and N×N are the only permissible PU shapes. In these cases, within each PU, a single intra prediction mode is coded, while video encoder 20 signals the chroma prediction mode at CU level. The N×N intra PU shapes are only allowed when the current CU size is equal to the smallest CU size defined in the corresponding Sequence Parameter Set (SPS).

Various partitioning schemes have been proposed and studied in the course of development beyond HEVC and other existing standards. One example is the quad-tree-binary-tree (QTBT) structure, which is described in further detail below. In VCEG proposal COM16-C966 ("Block partitioning structure for next generation video coding" by J. An, Y.-W. Chen, K. Zhang, H. Huang, Y.-W. Huang, and S. Lei, International Telecommunication Union, COM16-C966, September 2015), a quad-tree-binary-tree (QTBT) was proposed for future video coding standards beyond HEVC. Simulations showed the proposed QTBT structure is more efficient than the quad-tree structure in used HEVC.

In the proposed QTBT structure of COM16-C966, a CTB is first partitioned according to the quad-tree structure, where the quad-tree splitting of one node can be iterated until the node reaches a minimum allowed quad-tree leaf node size (MinQTSize). According to the QTBT structure, if the quad-tree leaf node size is not larger than a maximum allowed binary tree root node size (MaxBTSize), it can be further partitioned according to a binary tree structure. The binary tree splitting of one node can be iterated until the node reaches the minimum allowed binary tree leaf node size (MinBTSize) or the maximum allowed binary tree depth (MaxBTDepth). The binary tree leaf node is, namely, a CU which can be used for prediction (e.g. intra-picture or inter-picture prediction) and transform without any further partitioning.

In accordance with binary tree splitting, there are two splitting types, namely, symmetric horizontal splitting and symmetric vertical splitting. In one example of the QTBT partitioning structure, the CTU size is set as 128×128 (that is, 128×128 luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first, to generate quad-tree leaf nodes. The quad-tree leaf nodes may have a size ranging from 16×16 (i.e., the MinQTSize) to 128×128 (i.e., the CTU size). If the leaf quad-tree node is 128×128, then the leaf quad-tree node will not be further split according to the binary tree structure, because the quad-tree leaf node size exceeds the MaxBTSize (i.e., 64×64).

Otherwise (e.g., if the quad-tree leaf node size does not exceed the MaxBTSize of 64×64), the leaf quad-tree node may be further partitioned according to the binary tree structure. Therefore, the quad-tree leaf node is also the root node for the binary tree, and has a binary tree depth of 0. When the binary tree depth reaches MaxBTDepth (i.e., 4) by way of iterative binary splitting, it implies no further splitting of any kind. If the binary tree node has a width equal to MinBTSize (i.e., 4), it implies no further vertical splitting. Similarly, if the binary tree node has a height equal to the MinBTSize (4), it implies no further horizontal splitting. The leaf nodes of the binary tree are, namely, CUs further processed by prediction and transform without any further partitioning.

Figure 6B:
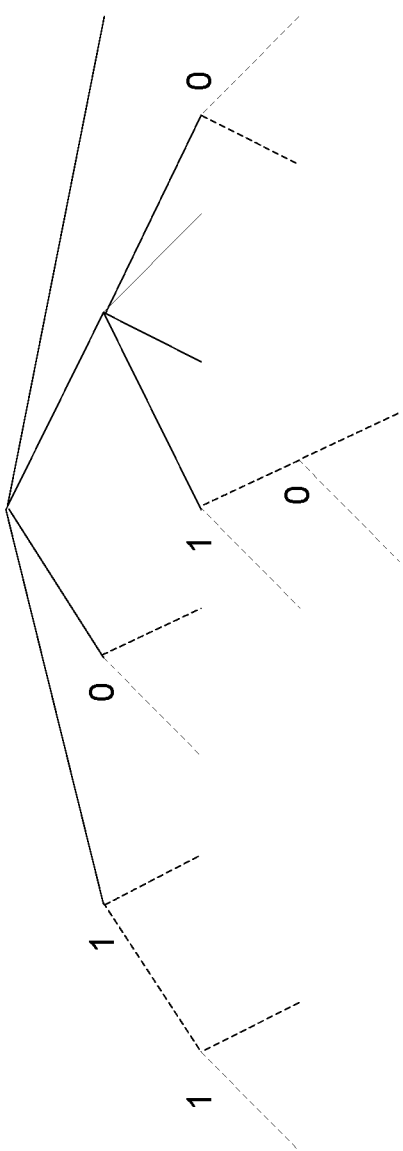
FIGS. 6A and 6B are conceptual diagrams illustrating aspects of the QTBT partitioning structure.
Figure 6A:
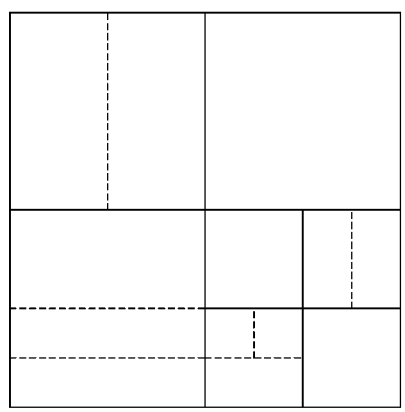

FIGS. 6A and 6B are conceptual diagrams illustrating aspects of the QTBT partitioning structure. FIG. 6A illustrates an example of block partitioning according to the QTBT structure. As such, FIG. 6A may be described as an illustration of QTBT structure. FIG. 6B illustrates the tree structure corresponding to the QTBT-based block partitioning shown in FIG. 6A. In FIG. 6B, the solid lines indicate quad tree-based splitting, and dashed lines indicate binary tree-based splitting. In each splitting node (i.e., non-leaf node) of the binary tree portion of FIG. 6B, video encoder 20 may signal one flag to indicate which binary splitting type (i.e., horizontal or vertical) is used. In the example of FIG. 6B, a flag value of zero (0) indicates horizontal splitting, and a flag value of one (1) indicates vertical splitting. For the quad tree-based portion of the QTBT structure, there is no need to signal an indication of the splitting type, because the splitting nodes of the quad tree-based portion are always split horizontally and vertically into four (4) sub-blocks with equal sizes.

Another tree structure that has been proposed and studied subsequently to HEVC is referred to as a "multi-type-tree structure." In U.S. Provisional Patent Application Nos. 62/279,233 and 62/311,248, the multi-type-tree structure was proposed and described. With the techniques described in U.S. Provisional Patent Application Nos. 62/279,233 and 62/311,248, a tree node may be further split using multiple tree types, such as the binary tree, a symmetric center-side triple tree, and/or the quad-tree structure. According to the two-level multi-type tree structure, a Region Tree (RT) is constructed first with quadtree partitions of a CTU. The RT portion of the multi-type tree structure is followed by the construction of a Prediction Tree (PT) portion of the multi-type tree structure. In the PT portion of the multi-type tree structure, only the binary tree and the symmetric center-side triple tree can be expanded.

That is, in the PT portion of the multi-type tree structure, video encoder 20 and/or video decoder 30 may split the splitting nodes according to one of the binary tree structure or the center-side triple tree structure. In the PT portion of multi-type tree-based splitting, a splitting node that resulted from a binary tree-based partition can be further split according to the center-side triple tree structure. Also, in the PT portion of multi-type tree-based splitting, a splitting node that resulted from a center-side triple tree-based partition can be further split according to the binary tree structure.

Figure 7B:
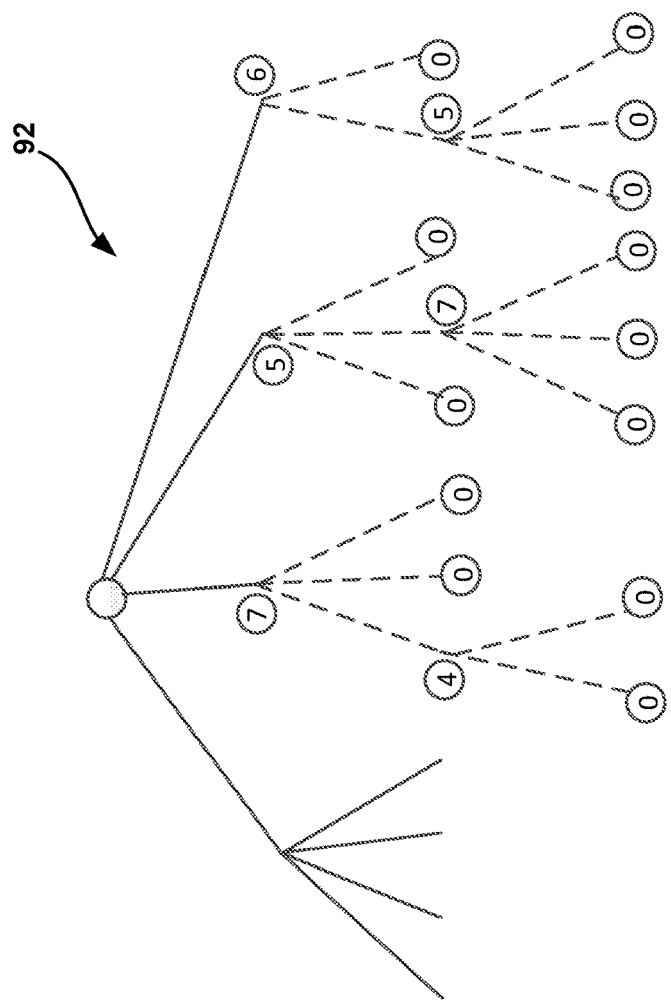
FIGS. 7A and 7B are conceptual diagrams illustrating one example use case of the multi-type tree block partitioning structure.
Figure 7A:
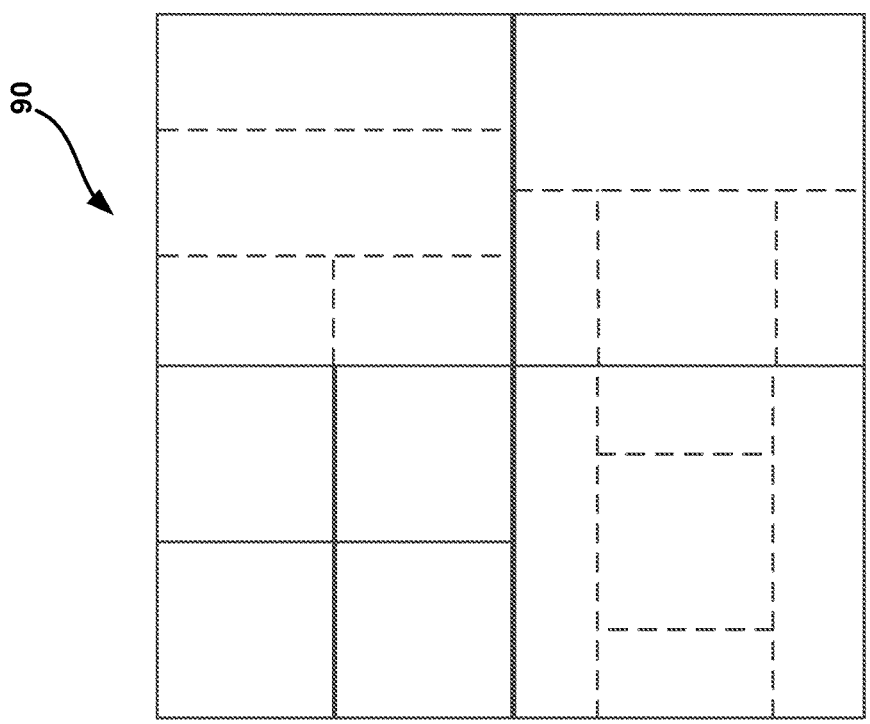

FIGS. 7A and 7B are conceptual diagrams illustrating one example use case of the multi-type tree block partitioning structure. FIG. 7A illustrates an example of a block that is partitioned according to the multi-type tree structure. As such, FIG. 7A may be described as an illustration of the multi-type tree partitioning structure. FIG. 7B illustrates the tree structure corresponding to the multi-tree type-based block partitioning shown in FIG. 7A.

In each of FIGS. 7A and 7B, solid lines are used to illustrate partitioning according to RT-based aspects of the multi-tree type partitioning structure, while dashed lines are used to illustrate partitioning according to the PT-based aspects of the multi-tree type partitioning structure. As shown in FIGS. 7A and 7B, in accordance with the multi-type tree partitioning structure, video encoder 20 and video decoder 30 begin the PT-based partitioning for a particular branch only after concluding the RT-based partitioning for that particular branch. Also, as illustrated in FIGS. 7A and 7B, video encoder 20 and video decoder 30 may implement both binary tree-based partitioning and center-side triple tree-based partitioning multiple time, and in any order, in the PT-based portion of a multi-type tree-based splitting scheme.

As shown in FIG. 7A, block 90 is first partitioned according to the quadtree structure, into four square sub-blocks. The quadtree split of block 90 is illustrated in FIG. 7B by way of a four-branch solid-line split of the root node. From left to right, each of the four branches splitting from the root node of partitioning tree 92 (in FIG. 7B) correspond respectively to the top-left, top-right, bottom-left, and bottom-right sub-blocks resulting from the quadtree (i.e., first RT-portion) split of block 90. The top-left sub-block is again split according to the quadtree partitioning structure, and each of the resulting sub-blocks represents a leaf node (i.e., is not further split). Because all splitting of the top-left sub-block of block 90 is performed according to the quadtree partitioning structure, the leftmost branch of partitioning tree 92 concludes within the RT portion of the multi-type tree partitioning scheme. The RT-limited nature of the leftmost branch of tree 92 is shown in FIG. 7B by way of solid lines being used to illustrate all splitting involving the leftmost branch of tree 92.

The top-right sub-block of block 92 is split according to the center-side triple tree partitioning structure, to form three rectangular sub-blocks. More specifically, in the case of the top-right sub-block of block 92, video encoder 20 and video decoder 30 implement a vertical split according to the center-side triple tree partitioning structure. That is, video encoder 20 and video decoder 30 split the top-right sub-block vertically, to form the three resulting rectangular sub-blocks. The vertical center-side triple tree-based split of the top-right sub-block is shown in partitioning tree 92 as a three-branch split of the second-from-left branch of the root node split. Because the top-right sub-block of block 90 is split according to the center-side triple tree partitioning structure, the splitting of the top-right sub-block is part of the PT portion of the multi-type tree-based scheme of partitioning tree 92. As such, the center-side triple tree-based splitting in the second-from-left branch of partitioning tree 92 is illustrated using a dashed line in FIG. 7B.

In turn, video encoder 20 and video decoder 30 implement binary tree-based splitting of the leftmost rectangular sub-block of the top-right sub-block, to form two rectangular sub-blocks. More specifically, video encoder 20 and video decoder 30 implement a horizontal version of the binary tree-based split, with respect to the leftmost sub-block of the top-right sub-block of block 90. The binary tree-based splitting is denoted in partitioning tree 92 using a dashed-line two-way split of the leftmost node that resulted from the split of the second-from-left branch.

The bottom-left sub-block of block 90 is split horizontally according to the center-side triple tree partitioning structure, and the resulting middle sub-block of this split is further split vertically according to the center-side triple tree partitioning structure. These aspects of the PT portion of the multi-type tree partitioning of block 90 are shown using dashed lines in the downstream partitioning of the third-from-left branch originating from the root node of partitioning tree 92.

The bottom-right sub-block of block 90 is split horizontally according to the binary tree partitioning structure, and the resulting left sub-block of this split is further split vertically according to the center-side triple tree partitioning structure. These aspects of the PT portion of the multi-type tree partitioning of block 90 are shown using dashed lines in the downstream partitioning of the rightmost branch originating from the root node of partitioning tree 92.

Compared to the CU structure in HEVC and compared to the QTBT structure, the multi-type tree structure illustrated in FIGS. 7A and 7B provides better coding efficiency, because the block partitions are more flexible. In addition, the introduction of the center-side triple tree provides more flexible localization of video signals. To maintain precision with respect to the PT-partitioned portions of a block that is partitioned according to the multi-type tree structure, video encoder 20 may signal, for each splitting node in the PT portions, an indication of the partitioning type implemented with respect to that particular splitting node.

To support precision with respect to the PT-partitioned portions, video encoder 20 may signal information that indicates the tree structure (binary or center-side triple tree) as well as the orientation of the partitioning (horizontal or vertical). For instance, video encoder 20 may use a codeword assignment to indicate the tree structure and orientation thereof for the partitioning of each splitting node of the PT-partitioned portions of the block. FIG. 7B includes decimal values of codewords that video encoder 20 may signal for each type of partitioning that is possible within the PT-portion of a multi-type tree partitioning structure. As shown in FIG. 7B, the decimal value of seven (7) indicates vertical center-side triple tree-based partitioning, the decimal value of five (5) indicates horizontal center-side triple tree-based partitioning, the decimal value of six (6) indicates vertical binary tree-based partitioning, and the decimal value of four (4) indicates horizontal binary tree-based partitioning. The decimal value of zero (0) identifies a leaf node in the PT-partitioned portion of the block. That is, video encoder 20 may signal the codeword representing the decimal value of zero (0) to indicate that the corresponding sub-block is not further partitioned.

Figure 8:
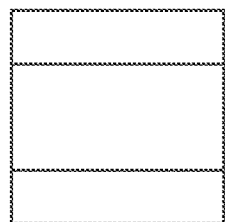
FIG. 8 is a conceptual diagram illustrating examples of codewords, expressed in binary format, that a video encoding device may signal for the various partitioning schemes that are possible in the PT-portion of a multi-type tree-partitioned block partitions.
Figure 8:
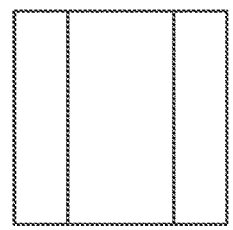
Figure 8:
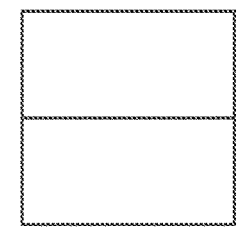
Figure 8:
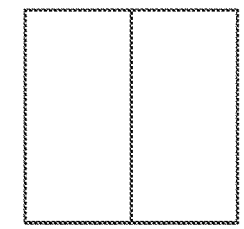
Figure 8:
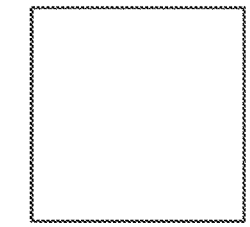

FIG. 8 is a conceptual diagram illustrating examples of codewords, expressed in binary format, that video encoder 20 may signal for the various partitioning schemes that are possible in the PT-portion of a multi-type tree-partitioned block partitions. FIG. 8 also illustrates the corresponding partitioning schemes for the various codewords. The binary values illustrated in FIG. 8 correspond to the decimal values illustrated in FIG. 7B. As such, the binary codeword "111" indicates vertical center-side triple tree-based partitioning, the binary codeword "101" indicates horizontal center-side triple tree-based partitioning, the binary codeword "110" indicates vertical binary tree-based partitioning, and the binary codeword "100" indicates horizontal binary tree-based partitioning. The binary codeword "000" identifies a leaf node in the PT-partitioned portion of the block. The first (leftmost) bin represents the value of a PT split flag (indicating whether the CU is split or not), the second bin represents the PT split direction (e.g., horizontal or vertical), and the third bin represents the PT split mode (e.g., binary tree or center-side triple tree).

FIGS. 7B and 8 illustrate an example of codeword assignment for the signaling of PT-portion partitioning information according to existing multi-type tree-based partitioning technology. As shown, according to the multi-type tree partitioning structure, video encoder 20 may signal three bits or bins for each PT node to indicate the partitioning information for the corresponding PT node. Conversely, video decoder 30 may decode three bits or bins to determine the block partition at each PT node. Again, the various block partitioning schemes represented by the various codewords shown in FIG. 8 are non-split, horizontal binary tree, vertical binary tree, horizontal triple tree, and vertical triple tree. In various use case scenarios, video encoder 20 and video decoder 30 may process a significant number of codewords with respect to a single block, such as in cases where the PT portion of the multi-type tree structure begins early and/or persists through the maximum partitioning depth. One such example is illustrated in FIGS. 7A and 7B. The multi-type tree structure has a two-level (RT and PT) nature, and the tree depth for a root block indicates a range of block sizes for the leaf nodes.

Thus, the multi-type tree partitioning structure, while beneficial from the standpoints of coding precision and partitioning flexibility, can be a resource-heavy and bandwidth-heavy coding scheme in many scenarios. The features of multi-type tree structure discussed above, along with the addition of triple partitions by way of the center-side triple tree structure, increase the number of bits/bins required to signal PT-portion partitioning information according to the multi-tree-type structure. As one example, for regular video content coded according to the multi-type tree structure, nine to fourteen percent (9%-14%) of the total quantity of bitstream bits are consumed for signaling codewords according to the codeword assignment illustrated in FIG. 8. Another potential issue presented by the technologies described above is that context modeling of tree-type signaling mostly uses relative depth between neighboring block(s) and the current block to determine the likelihood of a further split for the current block.

This disclosure is directed to techniques that address (e.g., by mitigating and in some cases, potentially eliminating) the issues described above, as well as other issues presented by existing video coding technologies and proposals that post-date HEVC. Techniques of this disclosure are generally directed to alleviating the resource and bandwidth consumption of the multi-type tree partitioning structure, while continuing to leverage the benefits provided by the multi-type tree partitioning structure. This disclosure provides various techniques to improve the efficiency of using the multi-type tree structure, and the techniques of this disclosure may be implemented individually or in various combinations and/or sequences. As such, certain aspects of this disclosure are described as being directed to more efficient coding of tree types.

According to some examples of this disclosure, under certain conditions, the three-bin requirement for signaling PT partitioning information may be excepted with respect to information that video encoder 20 signals to video decoder 30 for PT-portion partitioning. In some examples, video encoder 20 and video decoder 30 may determine PT partitioning information for a block based on information available from already-coded neighboring block(s), thereby reducing the number of codewords being signaled. In other examples, video encoder 20 may, in accordance with aspects of this disclosure, signal a different codeword scheme from the scheme shown in FIG. 8. Various examples of the coding constraints that can be implemented according to the techniques of this disclosure are described in further detail below. Some example techniques of this disclosure are directed to using more reliable contexts for better (e.g., enhanced) context modeling.

Some techniques of this disclosure are based on a recognition that the size of a block (a "current" block) relative to the size of neighboring block(s) of the current block can be used to select the contexts for PT tree-type coding of the current block. For instance, video encoder 20 and/or video decoder 30 may implement one or more of the techniques described herein to determine whether a current block is to be further split, and may base the determination on a ratio between the size of the current block and one or more of its neighboring blocks. By using the ratio between the size of the current block and the size(s) of the neighboring block(s) to determine whether the current block is to be further split, video encoder 20 and video decoder 30 may reduce the signaling overhead for multi-type tree-based coding, because the PT split flag (the leftmost bin of the codewords illustrated in FIG. 8) need not be signaled for the current block. Instead, video encoder 20 and video decoder 30 may perform similar operations to one another to determine whether or not to partition the current block based on the relative size compared to the neighboring block(s), thereby eliminating the need for explicit signaling of the PT split flag.

In one example, based on a determination that the width of the current block is greater than the width of an above-neighboring block, video encoder 20 and video decoder 30 may determine that the current block is likely to be further split. That is, if the above-neighboring block has a lesser width than the current block, then video encoder 20 and video decoder 30 may infer that the above-neighboring block is the result of a split, and that the current block is also to be split. In this way, video encoder 20 and video decoder 30 may leverage information from previously-coded above-neighboring blocks to reduce the signaling overhead with respect to partitioning information for the current block, while also making a determination as to whether the current block is to be split.

Similarly, based on a determination that the height of the current block is greater than the height of a left-neighboring block, video encoder 20 and video decoder 30 may determine that the current block is likely to be further split. That is, if the left-neighboring block has a lesser height than the current block, then video encoder 20 and video decoder 30 may infer that the left-neighboring block is the result of a split, and that the current block is also to be split. In this way, video encoder 20 and video decoder 30 may leverage information from previously-coded left-neighboring blocks to reduce the signaling overhead with respect to partitioning information for the current block, while also making a determination as to whether the current block is to be split.

Furthermore, video encoder 20 and video decoder 30 may use the relative size of one or more of an above-left, an above-right, or a below-left neighboring block in comparison to the current block size to infer whether the current block should be further split. For instance, if video encoder 20 and video decoder 30 determine that the area of the current block is greater than the area of one of the above-left, above-right, or below-left neighboring block, then video encoder 20 and/or video decoder 30 may determine that the current block is likely to be further split. At various portions of this disclosure, block area may be referred to block "size" and relative area information may be referred to as a "relative size" or "size ratio."

The determinations of relative width, relative height, and relative area are referred to herein as "events." In some examples, video encoder 20 and video decoder 30 may use an aggregated number of occurrences of one or more of the above-listed events to determine the context for the PT split flag, e.g., an inference of whether the current block is to be further split. In some examples, video encoder 20 and video decoder 30 may use an individual event to form a set of contexts for the PT split flag.

In some examples, video encoder 20 and video decoder 30 may utilize the width of the above-neighboring block and the height of the left-neighboring block to create a context for a PT split direction. That is, according to these examples, video encoder 20 and video decoder 30 may infer the value of the middle bin of the codewords illustrated in FIG. 8, based on the width of the above-neighboring block and the height of the left-neighboring block. If the width of the above-neighboring block is lesser than the width of the current block and the height of the left-neighboring block is greater or equal to the height of the current block, video encoder 20 and video decoder 30 may determine that the current block is likely to be split vertically.

Similarly, if the height of the left-neighboring block is lesser than the height of the current block and the width of the above-neighboring block is greater than or equal to the width of the current block, then video encoder 20 and video decoder 30 may determine that the current block is likely to be split horizontally. According to these aspects of this disclosure, video encoder 20 and video decoder 30 may implement the techniques of this disclosure to infer the PT split direction based on information accessible from previously-coded neighboring blocks. In this way, video encoder 20 and video decoder 30 may reduce the number of instances in which the PT split direction needs to be signaled in the form the of the middle bin of the codeword scheme illustrated in FIG. 8.

According to some examples of this disclosure, video encoder 20 and video decoder 30 may utilize the width of the above-neighboring block and the height of the left-neighboring block to infer the context for the PT split mode. That is, video encoder 20 and video decoder 30 may utilize the width of the above-neighboring block and the height of the left-neighboring block to select between the binary tree structure and the center-side triple tree structure for partitioning the current block, if the current block is to be partitioned in the PT portion at all. In these examples, if the width of the above-neighboring block is lesser than the width of the current block and the current block is vertically split, then video encoder 20 and video decoder 30 may determine that the current block is to be split according to the center-side triple tree partitioning structure.

In these examples, if the height of the left-neighboring block is lesser than the height of the current block and the current block is horizontally split, video encoder 20 and/or video decoder 30 may determine that the current block is likely to be split according to the center-side triple tree partitioning structure. In this manner, video encoder 20 and video decoder 30 may implement the techniques of this disclosure to infer the value of the rightmost bin of the codewords illustrated in FIG. 8, based on information from previously-coded neighboring blocks.

According to some examples of this disclosure, if video encoder 20 and video decoder 30 determine that the neighboring blocks of the current block are not available, then video encoder 20 and video decoder 30 may use a default context value during the derivation of a current context. For instance, video encoder 20 and video decoder 30 may apply the default context with respect to CABAC coding or entropy coding a syntax element that indicates partitioning information with respect to the current block.

In some examples, if video encoder 20 and video decoder 30 determine that different RT or PT splittings are allowed for different components (such as Y, Cb, Cr, or depth components), then video encoder 20 and/or video decoder 30 may apply all of the aforementioned techniques (e.g., all of the techniques described above with respect to utilizing relative height/width/area), but using the associated blocks in the other components. That is, instead of using information from the neighbor blocks discussed above, video encoder 20 and video decoder 30 may use relative height/width/area with respect to Y, Cb, Cr, or depth components of a block. As used herein, 'Y' denotes a luma component, Cb denotes a chroma component, and Cr denotes another chroma component.

Various techniques of this disclosure are based on a recognition that when calculating the context of the PT tree types, the positions of neighboring blocks can be defined statically or dynamically to adapt to video signals of various characteristics. For instance, these techniques enable video encoder 20 and video decoder 30 to select a particular neighboring block, in order to perform one or more of the relative height/width/area-based techniques described above. As one example, if the current block has multiple above-neighboring blocks, then video encoder 20 and video decoder 30 may implement the techniques described herein to select one of the above-neighboring blocks with which to perform relative width-based determinations. Similarly, if the current block has multiple left-neighboring blocks, then video encoder 20 and video decoder 30 may implement the techniques described herein to select one of the left-neighboring blocks with which to perform relative height-based determinations.

Figure 9:
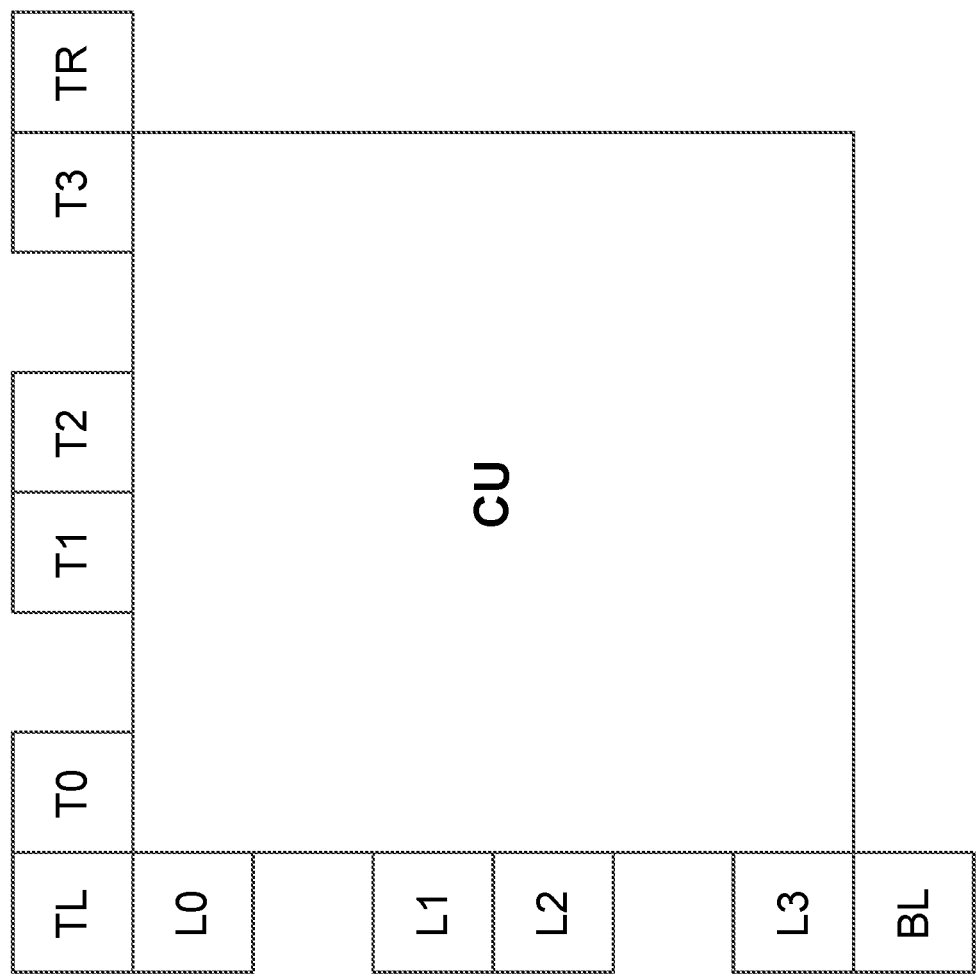
FIG. 9 is a conceptual diagram illustrating candidate positions of various above-neighboring and left-neighboring locations for context modeling of a PT split flag, in accordance with aspects of this disclosure.

FIG. 9 is a conceptual diagram illustrating candidate positions of various above-neighboring and left-neighboring locations for context modeling of a PT split flag, in accordance with aspects of this disclosure. As the range of the aspect ratio of CUs becomes higher compared to the aspect ratios provided by the previous coding standards, the position of the above-neighboring block can be chosen from immediately above of the top-left corner of the current block, immediately above of the center 4×4 block along the top boundary of the current block, or immediately above the rightmost 4×4 block in the top-right corner of the current block.

Positions T0-T3 in FIG. 9 illustrate examples of candidate positions for the above-neighboring block to be used for relative width-based determinations. Similarly, video encoder 20 and video decoder 30 may implement the techniques of this disclosure to select the left-neighboring block from positions such as immediately left of the top-left corner of the current block, immediately left of the center 4×4 block along the left boundary of the current block, or immediately left of the bottom-most 4×4 block in the bottom-left corner of the current block. Positions L0-L3 in FIG. 9 illustrate examples of candidate positions for the left-neighboring block to be used for relative height-based determinations. The selection of the above-neighboring and left-neighboring blocks according to the techniques described herein may yield improved accuracy as the aspect ratio of block sizes increases.

In one example, video encoder 20 and video decoder 30 may choose a block positioned at a location between T0 and T3 as the above-neighboring block, and may choose a block positioned at a location between L0 and L3 as the left-neighboring block when performing context modeling for the current block. In another example, video encoder 20 may specify the position of the above-neighboring block and the left-neighboring block by signaling the information in the Sequence Parameter Set (SPS), the Picture Parameter Set (PPS), or the Slice Header (SH). In these examples, video decoder 30 may select the position of the above-neighboring block and the left-neighboring block using information signaled in the SPS, the PPS, or the SH. By using neighboring-block position information signaled in the SPS/PPH/SH, video encoder 20 and video decoder 30 may use the same information for neighboring block selection across all PT-split blocks of a sequence, a picture, or a slice. In this way, video encoder 20 and video decoder 30 may reduce the signaling overhead by reducing the number of individual codewords that need to be signaled for the PT-based partitioning.

In one example, video encoder 20 may signal a pair or 2-tuple selected from the set {(TL, TR), (TL, BL), (TR, BL)} the SPS, PPS, or SH for context modeling. In one example, video encoder 20 and video decoder 30 may statically choose pair or 2-tuple selected from the set {(TL, TR), (TL, BL), (TR, BL)}. In the notation used above, 'TL' represents a top-left neighboring block, 'TR' represents a top-right neighboring block, 'BL' represents a bottom-left neighboring block, and 'BR' represents a bottom-right neighboring block.

In some examples, video encoder 20 and video decoder 30 may choose the position of the above-neighboring block and the left-neighboring block based on the shape of the current block. For instance, if the width of the current block is greater than the height, video encoder 20 and video decoder 30 may choose T1 or T2 illustrated in FIG. 9 as the above-neighboring block to be used in relative width-based determinations of this disclosure. Otherwise (e.g., if the current block's width is less than or equal to the height), video encoder 20 and video decoder 30 may choose T0 illustrated in FIG. 9 as the above-neighboring block to be used in relative width-based determinations of this disclosure. Similarly, if the height of the current block is greater than the width of the current block, then video encoder 20 and video decoder 30 may choose L1 or L2 illustrated in FIG. 9 as the left-neighboring block for relative height-based determinations of this disclosure. Otherwise, video encoder 20 and/or video decoder 30 may choose L0.

According to some examples, video encoder 20 and video decoder 30 may model a context using a combination of information from neighboring blocks at all positions shown in FIG. 9, if the positions are disjointed. For example, video encoder 20 and video decoder 30 may compare the current block width, height, or size (e.g., area) to the corresponding metrics for all of the surrounding neighboring blocks illustrated in FIG. 9, to predict the value of PT split flag, PT split direction, or PT split mode. By using a combination of the information from multiple neighboring blocks in this way, video encoder 20 and video decoder 30 may more accurately predict the PT split flag, the PT split direction and the PT split mode, because of the greater amount of heuristic data considered.

In another example, video encoder 20 may apply a constraint by which no further signaling is used. For instance, if the left-neighboring block and the above-neighboring block are both vertically partitioned according to the binary tree structure, video encoder 20 and video decoder 30 may infer that the current block is to be vertically partitioned according to the binary tree structure. Other such constraints can be applied in accordance with aspects of this disclosure, and it will be appreciated that the constraints of this disclosure are not limited to the example of the vertical binary partitioning constraint discussed above.

According to some aspects of this disclosure, video encoder 20 may apply constraints that may be appropriate on a case-by-case basis (e.g., also described as 'proper' constraints) on the tree-type signaling. In some cases, video encoder 20 may skip the bins used to signal the PT split direction or the PT split mode, given an allowable RT and PT depth. With respect to the discussion of these techniques the minimum block width and minimum block height are denoted by mW and mH, respectively.

In one example, video encoder 20 and video decoder 30 may determine that, if the width of the current block is equal to mW, then only horizontal PT splitting can occur with respect to the current block. In this case, video encoder 20 may not signal the PT split direction, because the PT split direction is inferred by video decoder 30 with respect to the current block. Similarly, in one example, if the height of the current block is equal to mH, then video encoder 20 may not signal the PT split direction, based on video decoder 30 inferring the PT split direction to be horizontal.

In one example, if the width of the current block is equal to (2×mW) and the current block is vertically split, then video encoder 20 may not signal the PT split mode, because only vertical binary tree partitioning is permitted in this case. Similarly, if the height of the current block is equal to (2×mH) and the current block is horizontally split, then video encoder 20 may not signal the PT split mode, because only horizontal binary tree partitioning is permitted in this case.

In some examples, video encoder 20 may signal a 'disabled' indication with respect to the binary tree or the triple tree or both in the bitstream. For instance, video encoder 20 may signal the 'disabled' indication in one or more syntax structures, such as in an SPS, and/or a PPS, and/or a slice header. If a tree type is signaled as disabled at a certain level, then video encoder 20 may skip the signaling of the PT split mode within that level. For instance, if video encoder 20 signals a disabled status in the PPS (that is, at picture-level), then video encoder may skip the signaling of the PT split mode for the entire picture.

In another example still, if different RT or PT splittings are allowed for different components (such as Y, Cb, Cr or depth components) of the current block, video encoder 20 may apply the RT or PT splitting constraint for the current component according to the RT and/or PT split of the associated blocks in the other components. For example, when coding a block in Cb or Cr components, if the Y component block is vertically split, then video encoder 20 may not signal the horizontal split mode for current component.

According to some aspects of this disclosure, video encoder 20 may select a codeword from a variable length coding (VLC) lookup table, instead of signaling the codewords illustrated in FIG. 8. The codewords of the VLC lookup table may provide alternative flexibility for some video signals where the joint probability of each partition type follows a skewed or highly-skewed distribution. The binarization process itself may encapsulate the coding information of the neighboring blocks, to yield the skewed probability distribution. In some examples of this disclosure, video encoder 20 and video decoder 30 may use different binarization methods for the current block partitioning, according to different neighbor block partitions.

In one example, video encoder 20 may use fixed-length (FL) codes of two bins to signal split-specific events. As discussed above, four different types of PT partitioning are possible within the multi-type tree structure. Again, the four types of PT partitioning are horizontal binary tree, vertical binary tree, horizontal center-side triple tree, and vertical center-side triple tree. In various examples of the two-bin FL codes of this disclosure, the definition of the first and the second bins may be interchangeable. That is, the first bin may represent the split direction and the second bin may represent the tree type, or vice versa.

Alternatively, video encoder 20 may use truncated unary (TU) codes to signal the partitions. Table 1 below shows one example of a codeword assignment scheme that video encoder 20 may use, in accordance with aspects of this disclosure.

TABLE 1

An example of codeword assignment for each partition type in PT

| Partition | Codeword |
|---|---|
| Horizontal binary tree | 10 |
| Vertical binary tree | 0 |
| Horizontal center-side triple tree | 110 |
| Vertical center-side triple tree | 111 |

It will be appreciated that the codeword assignment to each partition type can be based on the probability of each partition, and Table 1 above simply serves as a non-limiting example. Video encoder 20 may assign the shortest codeword to the most frequently-encountered scenario. In the example of Table 1, vertical binary tree partitioning may represent the most frequently-encountered scenario in the PT-partitioned portion, and hence, video encoder 20 may assign the '0' codeword to indicate vertical binary tree partitioning. In many use case scenarios, over 80% of the PT-partitioned blocks in a stream are split the same way. In this way, video encoder 20 may reduce the bitrate requirements for multi-type tree-based partitioning, by assigning shorter codewords to the more frequently-signaled indications.

In one example, if the left-neighboring block and the above-neighboring block are both vertically partitioned using binary tree, video encoder 20 and video decoder 30 may determine that the current block is highly possible or probable to be vertically partitioned as well. In this case, video encoder 20 and video decoder 30 may use a shorter codeword for vertical binary partition. In other words, video encoder 20 and video decoder 30 may use different partition binarization methods, depending on neighboring block partitions, according to this example. In this way, video encoder 20 may reduce the bitrate requirements for multi-type tree-based partitioning, by assigning shorter codewords to the more an indication that is most likely to be signaled for the current block.

In one example, video encoder 20 may signal the codeword selection in various syntax structures of the bitstream, such as an SPS, a PPS, or a SH. In another example, when different RT or PT splittings are allowed for different components (such as Y, Cb, Cr or depth components), the selection from the VLC lookup table for the current component can be applied according to the RT and/or PT split of the associated blocks in the other components. For example, when coding a block in Cb or Cr components and the associated block in Y component is vertically split, video encoder 20 may signal a shortened codeword for the vertical binary tree-based partition. In other words, according to this example, video encoder 20 may use different partition binarization methods, depending on the associated block partitions in the other component.

According to certain techniques of this disclosure, video encoder 20 and video decoder 30 may implement a predefined manner of splitting for all CTUs that span across a picture boundary. Because the splitting structure of cross-picture CTUs is predefined in these examples, video encoder 20 may not signal tree-type information until the partitioning results in all samples of each CU being located within the current picture.

In one example, the CTU can be split recursively by RT splitting without video encoder 20 signaling any CU split flags, until the recursive RT splitting reaches a stage where all nodes represent a resulting CU, the entirety of which is positioned within the current picture. In other examples, the CTU can be split recursively by using one selected type of PT splitting without video encoder 20 signaling any CU split flags, until the recursive splitting reaches a stage where all nodes represent a resulting CU the entirety of which is positioned within the current picture. In one example, video encoder 20 and video decoder 30 may split the CTU recursively by finding the most favorable representation using the regular tree-type signaling, including both RT and PT. For example, for a CTU for which a right-half lies outside the picture, one-level RT split forms a valid partition. Also, no split in RT with one-level PT split forms another valid partition.

A valid partition is defined as the partition where the entirety of each respective CU is positioned within the current picture. In another example, video encoder 20 may split the CTU adaptively, and video encoder 20 may signal a one-bit flag, or an index, or multiple flags to enable video decoder 30 to decide or determine which of the above-mentioned splitting schemes should be implemented. In this example, video decoder 30 may use the received information to select a splitting scheme that matches the adaptive splitting implemented by video encoder 20. In this way, video encoder 20 and video decoder 30 may reduce the bitrate requirements for codeword signaling in cases of a CTU spanning a picture boundary. Because the recursive splitting mechanism is predefined to partition such a CTU into CUs that each lie entirely within the current picture, video encoder 20 need not repeatedly signal codewords to indicate the splitting information at each node, at least until each CU is contained within a single picture.

Again, video encoder 20 and/or video decoder 30 may implement the above-described techniques individually, or in any combination where two or more of the techniques can be logically combined. As described above, the techniques of this disclosure are applicable to scenarios in which various tree types are used for block partitioning. For instance, the Region Tree (RT) partitioning may include but not be limited to quadtree partition, and the Prediction Tree (PT) partitioning may include but not be limited to binary tree partitioning and/or symmetric center-side triple tree partitioning.

Various implementations of the above-described techniques are described below. For instance, with respect to the neighboring block selection-based techniques described above with respect to FIG. 9, for each node in the prediction tree (PT) portion, video encoder 20 and/or video decoder 30 may perform the following coding:

1. For the PT split flag, video encoder 20 and video decoder 30 may use the width, height, and area pixel sizes to derive the context information.

a) In one example implementation, video encoder 20 and video decoder 30 may select the block width from the above-neighboring block located at position T2 (illustrated in FIG. 9). In this implementation, video encoder 20 and video decoder 30 may select the block height from the left-neighboring block located at position L2, and may select block sizes (e.g., areas) from the pair of (TL, TR). Let the block width and height be W and H, respectively. The value of context index can be calculated as:

$$CTX = (W > W_{T2}) + (H > H_{L2}) + (W*H > STL) + (W*H > STR) \quad (1)$$

where STL and STR represent the sizes of blocks occupying the locations of TL and TR in FIG. 9. Following Equation (1), an additional context can be selected if the following condition is satisfied:

$$CTX=((W<W_{T2})\&\&(H<H_{L2})\&\&(W*H<STL)\&\& \\ (W*H<STR)?5:CTX \quad (2)$$

In this implementation, the positions of T0, T1, T2, and T3 are calculated as:

$$T0 = (X0, Y0-1) \quad (3)$$

$$T1 = \left(X0 + \frac{W}{2} - 1, Y0 - 1\right)$$

$$T2 = \left(X0 + \frac{W}{2}, Y0 - 1\right)$$

$$T3 = (X0 + W - 1, Y0 - 1)$$

Similarly, the positions of L0, L1, L2, and L3 are calculated as:

$$L0 = (X0 - 1, Y0) \quad (4)$$

$$L1 = \left(X0 - 1, Y0 + \frac{H}{2} - 1\right)$$

$$L2 = \left(X0 - 1, Y0 + \frac{H}{2}\right)$$

$$L3 = (X0 - 1, Y0 + H - 1)$$

where (X0, Y0) is the pixel coordinate of the top-left corner of the current block. The unit sizes in Equations (3) and (4) are equal to the minimum block width and the minimum block height for X and Y directions, respectively.
b) In one example implementation, a smaller set of contexts can be defined as follows:

$$CTX=(W>W_{T2})+(H>H_{L2})+(W*H>STL)+(W*H>STR)$$

$$CTX=((W<W_{T2})\&\&(H<H_{L2})\&\&(W*H<STL)\&\& \\ (W*H<STR))?0:CTX$$

$$CTX=(CTX\geq 3)?3:CTX \quad (5)$$

c) In one example implementation, video encoder 20 and video decoder 30 may select the block width from any one of the top positions between T0 and T3, and may select the block height from any one of the positions between L0 and L3. In this implementation, video encoder 20 and video decoder 30 may select a pair of neighboring block sizes from the following sets:

$$\{(TL,TR),(TR,BL),(TL,BL)\}$$

The value of context index can be calculated using Equations (1) and (2) above, but with the T2, L2, STL, and STR positions being replaced with the selected ones.
Alternatively, video encoder 20 and/or video decoder 30 may make the selection based on the set of positions which minimizes the conditional entropy, and the index of the position set can be signaled in bitstream such as through SPS, PPS, or slice headers.
2. For a PT split direction, video encoder 20 and video decoder 30 may implement the techniques of this disclosure to utilize the block width, height, and their relative values to the top and the left neighbors to create the set of contexts.
a) In one example implementation, a set of context models can be defined as follows (according to Table 2 below):

TABLE 2

| Conditions | CTX |
|---|---|
| blkSizeX == blkSizeY | 0 |
| (blkSizeX > blkSizeY) && (blkSizeX <= 2*blkSizeY) | 1 |
| (blkSizeY > blkSizeX) && (blkSizeY <= 2*blkSizeX) | 2 |
| blkSizeX > 2*blkSizeY | 3 |
| blkSizeY > 2*blkSizeX | 4 | b) In one example implementation, a set of context models can be defined as follows (see also Table 3 below). Let condL and condT be two conditions for the left and the top neighbors:

condL=(blkSizeX==blkSizeY)&&(leftAvailable && blkSizeY>leftBlkSizeY)

condT=(blkSizeX==blkSizeY)&&(topAvailable && blkSizeX>topBlkSizeX)

TABLE 3

| Conditions | CTX |
|---|---|
| (blkSizeX == blkSizeY) && !condT && !condL | 0 |
| ((blkSizeX > blkSizeY) && (blkSizeX <= 2*blkSizeY)) \|\| condT | 1 |
| ((blkSizeY > blkSizeX) && (blkSizeY <= 2*blkSizeX)) \|\| condL | 2 |
| blkSizeX > 2*blkSizeY | 3 |
| blkSizeY > 2*blkSizeX | 4 | c) In one example implementation, a set of context models with lower complexity can be defined as follows (see also Table 4 below):
Let condL and condT be two conditions as follows:

condL=(blkSizeX==blkSizeY)&&(leftAvailable && blkSizeY>leftBlkSizeY)

condT=(blkSizeX==blkSizeY)&&(topAvailable && blkSizeX>topBlkSizeX)

TABLE 4

| Conditions | CTX |
|---|---|
| (blkSizeX == blkSizeY) && !condT && !condL | 0 |
| (blkSizeX > blkSizeY) \|\| condT | 1 |
| (blkSizeX > blkSizeX) \|\| condL | 2 |

3. For the PT split mode, video encoder 20 and video decoder 30 may implement certain techniques of this disclosure to utilize the block width, height, and the relative relationship among the top and the left blocks to create the set of contexts.
a) In one example implementation, a set of contexts can be defined as follows (see also Table 5 below). Let condL and condT be two conditions for the left-neighboring block and the above-neighboring block:

condL=(leftAvailable && blkSizeY>leftBlkSizeY)&&
 (horizontal_split)

condT=(topAvailable && blkSizeX>topBlkSizeX)&&
 (vertical_split)

TABLE 5

| Conditions | CTX |
|---|---|
| !condL && !condT | 0 |
| condL \|\| condT | 1 | b) In one example implementation, video encoder 20 and/or video decoder 30 may define a context as the likelihood of the flag itself. That is, the value of context index is set to 0.

c) In one embodiment, video encoder 20 may set the encoding of this bin to context-free, and bypass coding is performed for the flag in the CABAC engine.

4. An equivalent system can be derived by individually counting the number of levels of quarter-sized trees (which occur at the RT, and the first and third partitions in the triple trees) and the number of levels of other PT tree types.

a) In one example implementation, video encoder 20 and/or video decoder 30 may define a two-way depth system as follows. Let the depth of quarter-sized tree and the depth of half-sized tree be $D_Q$ and $D_H$, respectively. Video encoder 20 and/or video decoder 30 may calculate an equivalent depth D as:

$$D = 2 * D_Q + D_H \quad (6)$$

b) Video encoder 20 and/or video decoder 30 may apply a similar definition to width and height by taking the logarithmic values of the width and height. With the equivalent system, for example, Equation (1) above can be re-written as:

$$CTX = (\log(W) > \log(W_{T2})) + (\log(H) > \log(H_{L2})) + (D < D_{TL}) + (D < D_{TR}) \quad (7)$$

where $D_{TL}$ and $D_{TR}$ are the equivalent depth of blocks occupying the top-left and the top-right positions, respectively.

Figure 10:
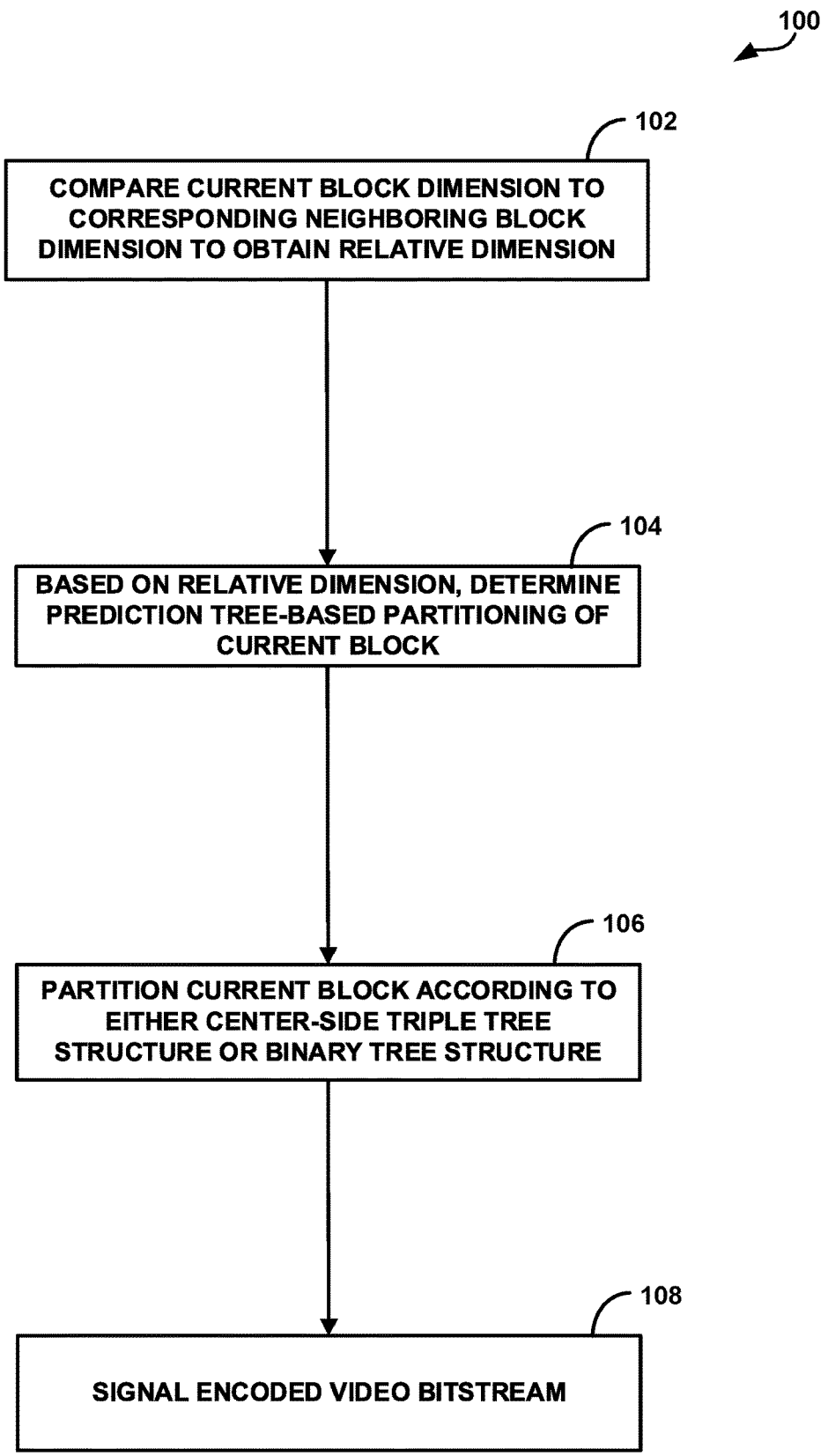
FIG. 10 is a flowchart illustrating an example process that a video encoding device may perform according to various aspects of this disclosure.

FIG. 10 is a flowchart illustrating an example process 100 that video encoder 20 (or processing circuitry thereof) may perform according to various aspects of this disclosure. Process 100 may begin when the processing circuitry of video encoder 20 compares a value of a dimension of the current block to a value of a corresponding dimension of a neighboring block to obtain relative dimension value information (102). In one example, the processing circuitry of video encoder 20 may compare the width of the current block to a width of an above-neighboring block that is positioned above the current block. In another example, the processing circuitry of video encoder 20 may compare the height of the current block to a height of a left-neighboring block that is positioned to the left of the current block. As such, the corresponding dimension of the neighboring block represents a measurement or metric that indicates form factor information of the neighboring block in a similar fashion to the dimension of the current block.

Based on the relative dimension value, the processing circuitry of video encoder 20 may determine that the current block is to be partitioned according to the PT portion of the multi-type tree partitioning structure (104). In one example, the processing circuitry of video encoder 20 may determine that the current block is to be partitioned according to the PT portion of the multi-type tree structure, based on a determination that the width of the current block is less than the width of the above-neighboring block. In another example, the processing circuitry of video encoder 20 may determine that the current block is to be partitioned according to the PT portion of the multi-type tree structure, based on a determination that the height of the current block is less than the height of the left-neighboring block.

In turn, the processing circuitry of video encoder 20 may partition the current block according to either the center-side triple tree structure or the binary tree structure (106). As discussed above, PT-portion partitioning follows either the binary tree structure or the center-side triple tree structure. In some examples, the processing circuitry of video encoder 20 may inherit the tree type (binary or center-side triple) from the neighboring block that was used to determine the relative dimension. In turn, the processing circuitry of video encoder 20 may signal an encoded video bitstream to video decoder 30 (108). For instance, the processing circuitry of video encoder 20 may use a network interface or other communications hardware of video encoder 20 to signal the bitstream.

In examples where the neighboring block is an above-neighboring block and the relative dimension value is based on a width comparison, to partition the current block, the processing circuitry of video encoder 20 may vertically partition the current block. In examples where the neighboring block is a left-neighboring block and the relative dimension value is based on a height comparison, to partition the current block, the processing circuitry of video encoder 20 may horizontally partition the current block.

In some examples, the neighboring block is a diagonally-neighboring block of the current block. The diagonally-neighboring block may include any of an above-left neighboring block that is positioned above and left of the current block, an above-right neighboring block that is positioned above and right of the current block, or a below-left neighboring block that is positioned below and right of the current block. In these examples, to compare the value of the dimension of the current block to the value of the corresponding dimension of the diagonally-neighboring block, the processing circuitry of video encoder 20 may compare, based on the neighboring block being the diagonally-neighboring block, an area of the current block to an area of the above-neighboring block.

In some examples, the processing circuitry of video decoder 30 may compare a width of the current block to a height of the current block to determine a shape of the current block. In these examples, to select the neighboring block, the processing circuitry of video decoder 30 may select the neighboring block from one of the plurality of left-neighboring blocks or the plurality of above-neighboring blocks based on the determined shape of the current block.

In some examples, the processing circuitry of video encoder 20 may select the neighboring block from one of (i) a plurality of above-neighboring blocks that includes a first above-neighboring block that is positioned above a leftmost 4×4 sub-block along a top boundary of the current block, a second above-neighboring block that is positioned above a middle 4×4 sub-block along the top boundary of the current block, and a third above-neighboring block that is positioned above a rightmost 4×4 sub-block along the top boundary of the current block, or (ii) a plurality of left-neighboring blocks that includes a first left-neighboring block that is positioned left of a top 4×4 sub-block along a left boundary of the current block, a second left-neighboring block that is positioned left of a middle 4×4 sub-block along the left boundary of the current block, and a third left-neighboring block that is positioned left of a bottom 4×4 sub-block along the left boundary of the current block. In some examples, the processing circuitry of video encoder 20 may use communication hardware of video encoder 20 to signal, in one of a sequence parameter set (SPS), a picture parameter set (PPS), or a slice header (SH), an indication of the selected neighboring block for one or more blocks in a unit of the video data that corresponds to the respective one of the SPS, PPS, or SH.

In some examples, the processing circuitry of video encoder 20 may assign a respective codeword of a plurality of codewords to a respective direction-tree type combination of a plurality of direction-tree type combinations for partitioning the current block. In these examples, the plurality of codewords includes a 0 codeword, a 10 codeword, a 110 codeword, and a 111 codeword, and the plurality of direction-tree type combinations includes a horizontal-binary tree combination, a vertical-binary tree combination, a horizontal center-side-triple tree combination, and a vertical center-side triple tree combination. In these examples, to partitioning the current block according to the PT portion of the multi-type tree-based partitioning scheme, the processing circuitry of video encoder 20 may partition the current block according to a particular direction-tree type combination included in the plurality of direction-tree type combinations. The processing circuitry of video encoder 20 may use communication hardware of video encoder 20 to signal, in an encoded video bitstream, the respective codeword assigned to the particular direction-tree type combination according to which the current block is partitioned.

Figure 11:
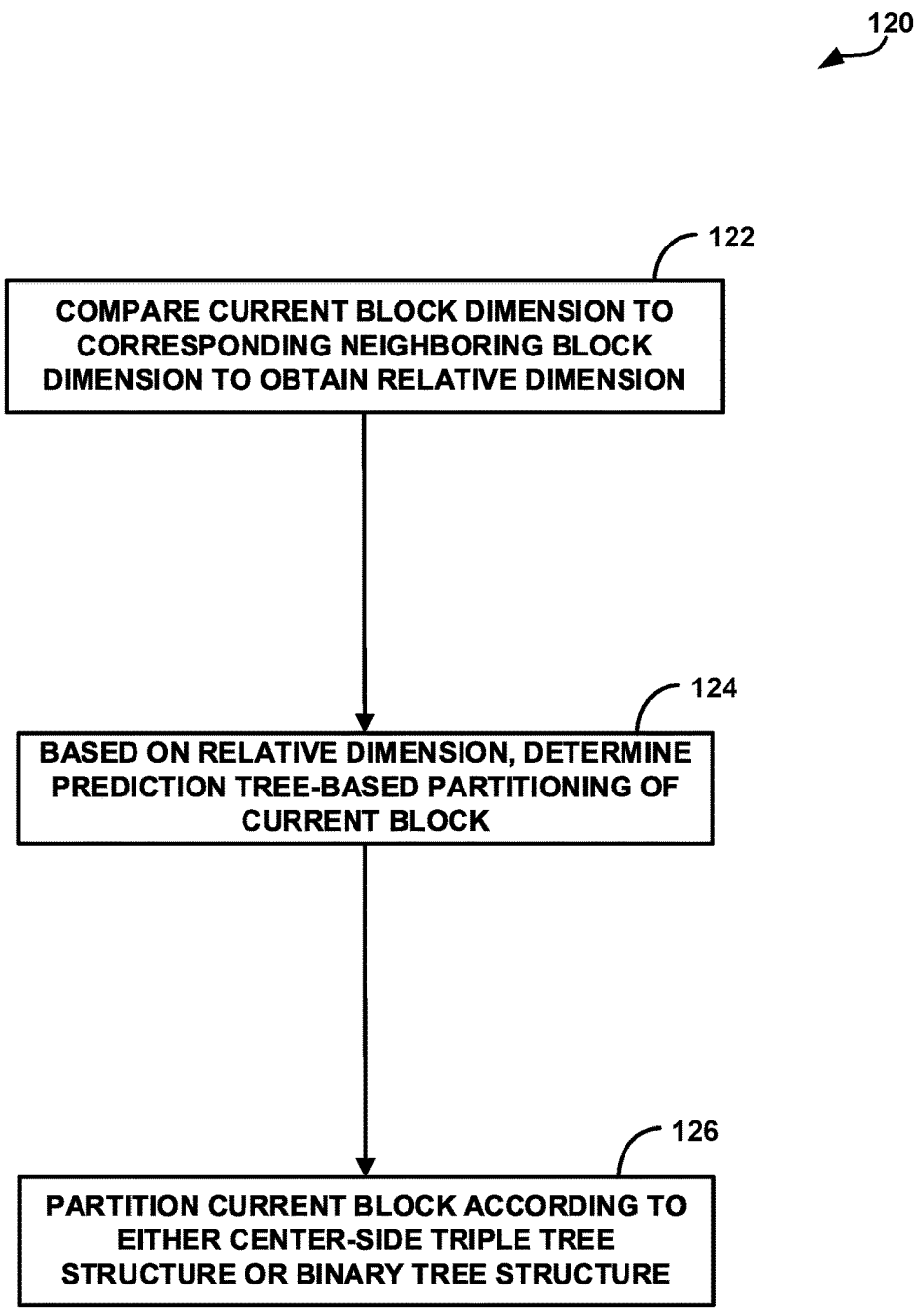
FIG. 11 is a flowchart illustrating an example process that a video decoding device may perform according to various aspects of this disclosure.

FIG. 11 is a flowchart illustrating an example process 120 that processing circuitry of video decoder 30 may perform according to various aspects of this disclosure. Process 120 may begin when the processing circuitry of video decoder 30 compares a value of a dimension of the current block to a value of a corresponding dimension of a neighboring block to obtain relative dimension value information (122). In one example, the processing circuitry of video decoder 30 may compare the width of the current block to a width of an above-neighboring block that is positioned above the current block, based on the neighboring block being an above-neighboring block. In another example, the processing circuitry of video decoder 30 may compare the height of the current block to a height of a left-neighboring block that is positioned to the left of the current block, based on the neighboring block being a left-neighboring block. As such, the corresponding dimension of the neighboring block represents a measurement or metric that indicates form factor information of the neighboring block in a similar fashion to the dimension of the current block.

Based on the relative dimension value, the processing circuitry of video decoder 30 may determine that the current block is to be partitioned according to the PT portion of the multi-type tree partitioning structure (124). In one example, the processing circuitry of video decoder 30 may determine that the current block is to be partitioned according to the PT portion of the multi-type tree structure, based on a determination that the width of the current block is less than the width of the above-neighboring block. In another example, the processing circuitry of video decoder 30 may determine that the current block is to be partitioned according to the PT portion of the multi-type tree structure, based on a determination that the height of the current block is less than the height of the left-neighboring block.

In turn, the processing circuitry of video decoder 30 may partition the current block according to either the center-side triple tree structure or the binary tree structure (126). As discussed above, PT-portion partitioning follows either the binary tree structure or the center-side triple tree structure. In some examples, the processing circuitry of video decoder 30 may inherit the tree type (binary or center-side triple) from the neighboring block that was used to determine the relative dimension. In examples where the neighboring block is an above-neighboring block and the relative dimension value is based on a width comparison, to partition the current block, the processing circuitry of video decoder 30 may vertically partition the current block. In examples where the neighboring block is a left-neighboring block and the relative dimension value is based on a height comparison, to partition the current block, the processing circuitry of video decoder 30 may horizontally partition the current block.

In some examples, the neighboring block is a diagonally-neighboring block of the current block. The diagonally-neighboring block may include any of an above-left neighboring block that is positioned above and left of the current block, an above-right neighboring block that is positioned above and right of the current block, or a below-left neighboring block that is positioned below and right of the current block. In these examples, to compare the value of the dimension of the current block to the value of the corresponding dimension of the diagonally-neighboring block, the processing circuitry of video decoder 30 may compare, based on the neighboring block being the diagonally-neighboring block, an area of the current block to an area of the above-neighboring block.

In some examples, the processing circuitry of video decoder 30 may select the neighboring block from one of (i) a plurality of above-neighboring blocks that includes a first above-neighboring block that is positioned above a leftmost 4×4 sub-block along a top boundary of the current block, a second above-neighboring block that is positioned above a middle 4×4 sub-block along the top boundary of the current block, and a third above-neighboring block that is positioned above a rightmost 4×4 sub-block along the top boundary of the current block, or (ii) a plurality of left-neighboring blocks that includes a first left-neighboring block that is positioned left of a top 4×4 sub-block along a left boundary of the current block, a second left-neighboring block that is positioned left of a middle 4×4 sub-block along the left boundary of the current block, and a third left-neighboring block that is positioned left of a bottom 4×4 sub-block along the left boundary of the current block.

In some examples, the processing circuitry of video decoder 30 may use communication hardware (a wired or wireless receiver) of video decoder 30 to receive, in an encoded video bitstream, one of a sequence parameter set (SPS), a picture parameter set (PPS), or a slice header (SH). In these examples, the processing circuitry of video decoder 30 may decode, from the received SPS, PPS, or SH, an indication of the selected neighboring block for one or more blocks in a unit of the video data that corresponds to the respective one of the SPS, PPS, or SH. In some examples, the processing circuitry of video decoder 30 may compare a width of the current block to a height of the current block to determine a shape of the current block. In these examples, to select the neighboring block, the processing circuitry of video decoder 30 may select the neighboring block from one of the plurality of left-neighboring blocks or the plurality of above-neighboring blocks based on the determined shape of the current block.

In some examples, the processing circuitry of video decoder 30 may compare at least one of a width of the current block or a height of the current block, respectively, to at least one of a predetermined minimum width for the current block or a predetermined minimum height for the current block, and may determine at least one of a tree type for partitioning the current block or a partitioning direction for partitioning the current block based on the comparison. In some examples, the current block is a current coding unit (CU). In some such examples, the processing circuitry of video decoder 30 may determine that a coding tree unit (CTU) of the video data spans a picture boundary such that a size of the CTU extends beyond a padding region of a current picture, and based on the CTU spanning the picture boundary, the processing circuitry of video decoder 30 may recursively partition the CTU using a predetermined partitioning scheme of the multi-type tree structure to form a plurality of coding units (CUs) that includes the current CU, such that the current CU is positioned entirely within the current picture.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), fixed function processing circuitry, programmable processing circuitry, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining a ratio between a value of a dimension of a current block of video data and a value of a corresponding dimension of a neighboring block of the current block, the neighboring block being positioned adjacent to the current block;
   determining a respective entropy decoding context for one or more of a a split direction syntax element, or a split mode syntax element for the current block of video data based on the ratio;
   decoding one or more of the the split direction syntax element, or the split mode syntax element for the current block of video data using the determined respective entropy decoding contexts; and
   decoding the current block of video data in accordance with one or more oft the split direction syntax element, or the split mode syntax element for the current block of video data, wherein the split direction syntax element or the split mode syntax element define a portion of a multi-type tree-based partitioning scheme and wherein the multi-type tree-based partitioning scheme includes a binary tree structure and a center-side triple tree structure, and the portion of the multi-type tree-based partitioning scheme comprises partitioning according to one of the binary tree structure or the center-side triple tree structure.

2. The method of claim 1, wherein decoding the current block of video data in accordance with one or more of the split direction syntax element, or the split mode syntax element for the current block of video data comprises:
    determining a partitioning for the current block according to the portion of the multi-type tree-based partitioning scheme indicative of a plurality of sub-blocks; and
    decoding each of the plurality of sub-blocks.

3. The method of claim 1, wherein the neighboring block comprises an above-neighboring block that is positioned above the current block, and wherein determining the ratio between the dimension of the current block and the corresponding value of the dimension of the above-neighboring block comprises determining a ratio of a width of the current block and a width of the above-neighboring block.

4. The method of claim 1, wherein the neighboring block comprises one or more of a top-left neighboring block, a top-right neighboring block, or a bottom-left neighboring block.

5. The method of claim 1, further comprising:
    displaying a picture that includes the decoded current block.

6. An apparatus configured to decode video data, the apparatus comprising:
    a memory configured to store a current block of video data; and
one or more processors in communication with the memory, the one or more processors configured to:
determine a ratio between a value of a dimension of the current block of video data and a value of a corresponding dimension of a neighboring block of the current block, the neighboring block being positioned adjacent to the current block;
    determine a respective entropy decoding context for one or more of a split direction syntax element, or a split mode syntax element for the current block of video data based on the ratio;
    decode one or more of the split direction syntax element, or the split mode syntax element for the current block of video data using the determined respective entropy decoding contexts; and
    decode the current block of video data in accordance with one or more of the split direction syntax element, or the split mode syntax element for the current block of video data, wherein the split direction syntax element, or the split mode syntax element define a portion of a multi-type tree-based partitioning scheme and wherein the multi-type tree-based partitioning scheme includes a binary tree structure and a center-side triple tree structure, and the portion of the multi-type tree-based partitioning scheme comprises partitioning according to one of the binary tree structure or the center-side triple tree structure.

7. The apparatus of claim 6, wherein to decode the current block of video data in accordance with one or more of the split direction syntax element, or the split mode syntax element for the current block of video data, the one or more processors are further configured to:
    determine a partitioning for the current block according to the portion of the multi-type tree-based partitioning scheme indicative of a plurality of sub-blocks; and
    decode each of the plurality of sub-blocks.

8. The apparatus of claim 6, wherein the neighboring block comprises an above-neighboring block that is positioned above the current block, and wherein to determine the ratio the value of the dimension of the current block and the corresponding value of the dimension of the above-neighboring block, the one or more processors are configured to determine a ratio a width of the current block and a width of the above-neighboring block.

9. The apparatus of claim 6, wherein the neighboring block comprises one or more of a top-left neighboring block, a top-right neighboring block, or a bottom-left neighboring block.

10. The apparatus of claim 6, the apparatus further comprising:
    a display configured to display a picture that includes the decoded current block.

11. An apparatus configured to encode video data, the apparatus comprising:
    a memory configured to store a current block of video data; and
one or more processors in communication with the memory, the one or more processors configured to:
determine a ratio between a value of a dimension of the current block of video data and a value of a corresponding dimension of a neighboring block of the current block, the neighboring block being positioned adjacent to the current block;
    determine a respective entropy encoding context for one or more of a split direction syntax element, or a split mode syntax element for the current block of video data based on the ratio;
    encode one or more of the split direction syntax element, or the split mode syntax element for the current block of video data using the determined respective entropy encoding contexts; and
    encode the current block of video data in accordance with one or more of the split direction syntax element, or the split mode syntax element for the current block of video data, wherein the split direction syntax element, or the split mode syntax element define a portion of a multi-type tree-based partitioning scheme and wherein the multi-type tree-based partitioning scheme includes a binary tree structure and a center-side triple tree structure, and the portion of the multi-type tree-based partitioning scheme comprises partitioning according to one of the binary tree structure or the center-side triple tree structure.

12. The apparatus of claim 11, wherein the neighboring block comprises an above-neighboring block that is positioned above the current block, and wherein to determine the ratio the value of the dimension of the current block and the corresponding value of the dimension of the above-neighboring block, the one or more processors are configured to determine a ratio a width of the current block and a width of the above-neighboring block.

13. The apparatus of claim 11, wherein the neighboring block comprises one or more of a top-left neighboring block, a top-right neighboring block, or a bottom-left neighboring block.

14. The apparatus of claim 11, the apparatus further comprising:
    a camera configured to capture a picture that includes the current block.

15. The apparatus of claim 11, wherein to encode the current block of video data in accordance with one or more of the split direction syntax element, or the split mode syntax element for the current block of video data, the one or more processors are further configured to:
    determine the portion of the multi-type tree-based partitioning scheme;

determine a partitioning for the current block according to the portion of the multi-type tree-based partitioning scheme to define a plurality of sub-blocks; and encode each of the plurality of sub-blocks.

* * * * *